US007924139B2

(12) United States Patent (10) Patent No.: US 7,924,139 B2
Sasakura et al. (45) Date of Patent: Apr. 12, 2011

(54) WIRELESS AUTHENTICATION METHOD AND WIRELESS AUTHENTICATION SYSTEM

(75) Inventors: Toyoki Sasakura, Tokyo (JP); Kenichi Miyamoto, Tokyo (JP)

(73) Assignee: Shionoya Yasuo, Tokyo (JP)

( * ) Notice: Subject to any disclaimer, the term of this patent is extended or adjusted under 35 U.S.C. 154(b) by 899 days.

(21) Appl. No.: 11/892,647

(22) Filed: Aug. 24, 2007

(65) Prior Publication Data

US 2007/0294746 A1 Dec. 20, 2007

Related U.S. Application Data

(63) Continuation of application No. PCT/JP2005/003212, filed on Feb. 25, 2005.

(51) Int. Cl.
*G05B 19/00* (2006.01)
(52) U.S. Cl. .................. 340/5.8; 340/5.2; 340/3.1
(58) Field of Classification Search .............. 340/3.1, 340/539.11, 10.5, 539.21; 455/411, 420, 455/558
See application file for complete search history.

(56) References Cited

U.S. PATENT DOCUMENTS 6,868,282 B2 * 3/2005 Carlsson .................. 455/558

FOREIGN PATENT DOCUMENTS

| JP | 4-306760 | 10/1992 |
| JP | 2931276 | 5/1999 |
| JP | 2002-269052 | 9/2002 |
| JP | 2002-351844 | 12/2002 |
| WO | 03/058936 | 7/2003 |
| WO | 2006/038290 | 4/2006 |

OTHER PUBLICATIONS

International Search Report of International published Application No. PCT/JP2005/003212 (mailed May 31, 2005).
PCT Published Application No. WO 2006/090476 Al, published Aug. 31, 2006 (International Application No. PCT/JP2005/003212).

* cited by examiner

*Primary Examiner* — Vernal U Brown
(74) *Attorney, Agent, or Firm* — Staas & Halsey LLP

(57) ABSTRACT

A first communication device performs a first, a second, and a third authentication processing for a second communication device, a authentication station sends to the first communication device a confirmation signal indicating that a person's identity is confirmed, when the authentication station succeeds the authentication of the second communication device, so that the authentication station validates the cancellation of a usage restrictions of the controlled device imposed by the first communication device based on the cancellation permission signal.

15 Claims, 17 Drawing Sheets

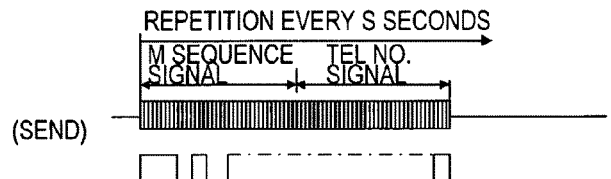
(SEND)
FIG.8A
(RECEIVE)
FIG.8B
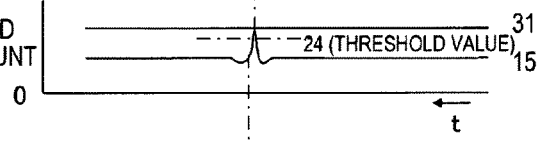
FIG.9A
FIG.9B
FIG.9C

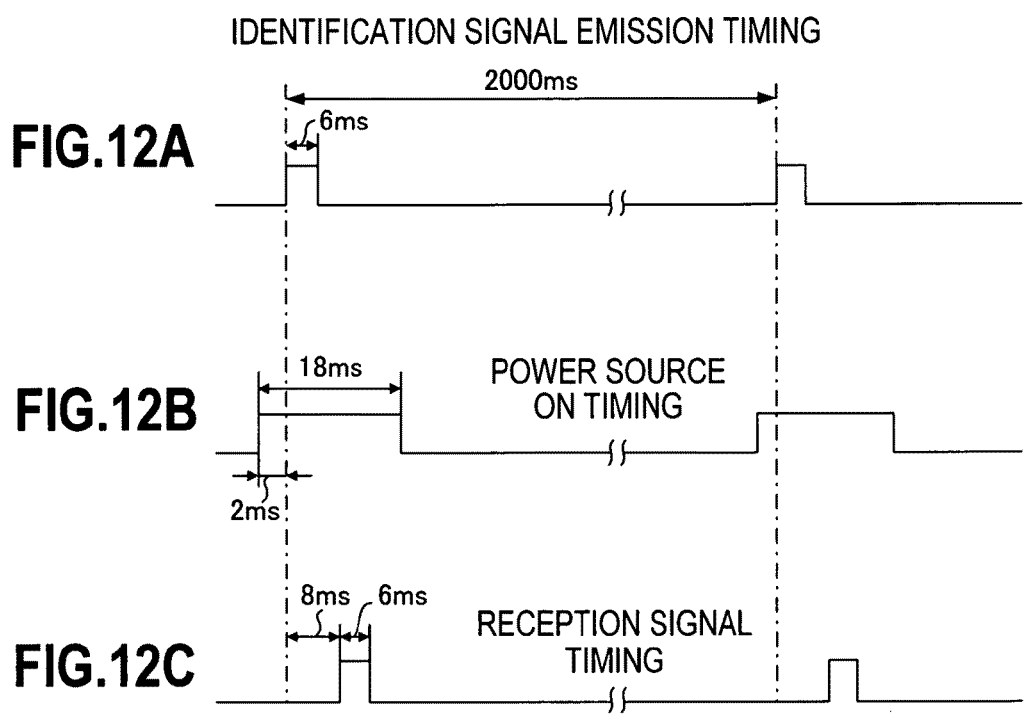

RECEPTION SIGNAL DETECTION WAVEFORM

WAVEFORM FOLLOWING
THRESHOLD VALUE PROCESSING

CONFIRMATION SIGNAL

|← 9.1ms →|← 2.9ms →|
M SEQUENCE CODE (31 BITS) | TELEPHONE NUMBER CODE (29 BITS)

FIG.15

| A(KBID) | B(KID) | C | D | E |
|---|---|---|---|---|
| PORTABLE TERMINAL ID | WEARABLE KEY ID | CONTROLLED DEVICE ID | NAME | FINGERPRINT INFORMATION |
| 1001 | 2001 | 3001 | AOKI A | Aaaaaaaaaaaaaaaaaaa |
| 1002 | 2002 | 3002 | AOKI B | Bbbbbbbbbbbbbbbbbb |
| 1003 | 2003 | 3003 | AOKI C | Ccccccccccccccccc |
| 1004 | 2004 | 3004 | AOKI D | Dddddddddddddddddd |
| 1005 | 2005 | 3005 | AOKI E | Eeeeeeeeeeeeee |
| 1006 | 2006 | 3006 | AOKI F | Ffffffffffffffffffffff |
| 1007 | 2007 | 3007 | AOKI G | Ggggggggggggggggggg |
| 1008 | 2008 | 3008 | AOKI H | Hhhhhhhhhhhhhhhhh |
| 1009 | 2009 | 3009 | AOKI I | Iiiiiiiiiiiiiiiiiiiiiiiii |
| 1010 | 2010 | 3010 | AOKI J | Jjjjjjjjjjjjjjjjjjjjjjjjj |

WIRELESS AUTHENTICATION METHOD AND WIRELESS AUTHENTICATION SYSTEM

CROSS REFERENCE TO RELATED APPLICATIONS

This application is a continuation of International Application No. PCT/JP2005/003212, filed on Feb. 25, 2005, now pending, herein incorporated by reference.

TECHNICAL FIELD

The present invention relates to a wireless authentication method and wireless authentication system whereby a key-side device and device-side device perform mutual authentication by means of wireless signals.

BACKGROUND ART

As an example, if we let a device for proving personal authentication be a portable communication terminal provided with a communication function like that of a cellular phone, in order to provide people with peace of mind in the evolving society of ubiquitous mobile communications, each portable communication terminal with the personal authentication function will have to be unique.

It is assumed that an example of the use of such a portable communication terminal as a device for proving personal authentication is a keyless entry system for an automobile as shown in FIG. 1, where the door can be locked and unlocked wirelessly using radio waves instead of a key.

In FIG. 1, the user carries a portable device 2 which serves as a key for an automobile 1, and uses the portable device 2 from a distance to control an unlocking control device 10 for the doors of automobile 1 by means of a wireless signal and operate the locking and unlocking of the door lock.

More specifically, in portable device 2, a predetermined ID is stored in a memory 2a. When the portable device 2 is used by pressing a key switch, the wireless frequency is modulated according to the ID stored in memory 2a by means of a wireless modulator 2b which utilizes a predetermined modulation system, whereupon the signal is power-amplified and delivered using a transmitter 2c.

The automobile 1, which is a controlled device, comprises an unlocking control device 10. The unlocking control device 10 has the same ID as the key 2 and this ID is contained in a memory 10a. The unlocking control device 10 receives the wireless signal from portable device 2 by means of a receiver 10b, converts the signal to a base band signal, and then demodulates the transmitted ID using a demodulator 10c by means of a demodulation system that corresponds to the modulation system of key 2.

A comparator 10d compares the demodulated ID from key 2 with the ID stored in memory 10a and judges whether or not they coincide. If the result of the comparison is coincidence with the ID stored in memory 10a in unlock control device 10, a door release directive signal is sent to a door unlock control device 10e, and it becomes possible to unlock the door.

Thus, a wireless authentication system, where an ID is transmitted wirelessly, its authenticity is checked by the controlled device, and, based on the result of that check, the door unlocking device 10e of an automobile which is the controlled device is operated remotely, is able to implement a security operation by recognizing the person that owns portable device 2 which serves as a key as the proper user.

Therefore, in a case where, due to loss or theft, portable device 2 is acquired by a malicious third party, that malicious third party becomes able to pose as the correct user, and operate the locking and unlocking of the door lock of automobile 1. Hence, there is a need to ensure security by preventing a third party from posing as the owner and performing an illegal operation.

Situations where a third party poses as the owner and performs an illegal operation is not limited to the door locks of automobiles. There is a similar need to prevent such an occurrence for portable devices that remotely monitor and operate a controlled device such as house door keys, cameras, PDAs (Personal Digital Assistants), computers, or a cellular phone. It follows that there is a similar need to ensure security in cases where these devices are being remotely monitored or operated by wireless means.

In a previous application (see Japanese Patent No. 2931276), the present inventors proposed an invention of a system where, if the primary user is a predetermined distance from the device to be operated, such as a computer or portable communication terminal, that device becomes unusable. Such inventions as the one described in Japanese Application Laid Open No. 2931276 have adopted wearable keys, which are carried by the user separately from the device which is to be operated by the user.

The device to be operated and the wearable key perform two-way communications in which they each have an intrinsic distinctive ID, and perform two-way communication at fixed intervals, thereby confirming each other. Both the device to be operated and the wearable key use an encryption technology to communicate their distinctive IDs, and the encryption is modified every time, which makes it extremely difficult to decrypt. Therefore, as long as the primary user holds the wearable key, it is possible to prevent other people from utilizing the device which should be operated by the primary user.

However, even with the system disclosed in Japanese Application Laid Open No. 2931276, even if the portable device is in the possession of the legitimate user and a third party has not illegally acquired the portable device through theft or the like, it is possible by some means to eavesdrop on the wirelessly communicated distinctive ID, and thus produce a portable device with the same distinctive ID (clone device) and use that device illegally.

A clone device is a separate device that possesses functions which are the same as the wireless authentication function (including an ID) of the portable device owned by the legitimate user. Through the use of a clone device, a malicious third party is able to pose as the legitimate user and use the device improperly. In this case, because the legitimate portable device is in the proper user's possession, the existence of a clone device is a concern until the clone device is used improperly and improper usage by the clone device cannot be prevented.

In view of this point, the present inventor disclosed, in yet another previous application, an invention relating to a wireless confirmation method and a wireless authentication system that are capable of preventing improper usage by a third party or improper usage by a clone device (PCT/JP2004/14747).

The invention of the previous application (known simply as 'prior invention' hereinbelow) is characterized by comprising the authentication station 5 as shown in FIG. 2. In other words, the wireless authentication system shown in FIG. 2 assumes, for the door unlocking control device 10 of the automobile 1 which is the controlled device, that a device that is capable of wirelessly imposing usage restrictions and canceling the usage restrictions is a portable communication terminal.

Therefore, the wireless authentication system is constituted comprising a portable communication terminal 3 that is capable of imposing usage restrictions for the door unlocking control device 10 and of canceling the usage restrictions, a wearable key unit 4 that is capable of imposing usage restrictions for the portable communication terminal 3 and of canceling the usage restrictions, and an authentication station 5.

The authentication station 5 is capable of optionally communicating by means of a communication systems CS1 and CS2 with the portable communication terminal 3 and door unlocking control device 10 respectively. In cases where the portable communication terminal 3 is a cellular phone terminal, the portable communication terminal 3 connects to the authentication station 5 by means of the cellular phone line CS1 and the door unlocking control device 10 also connects to the authentication station 5 by means of a PHS or other communication line CS2, for example. In cases where the door unlocking control device 10 is a device that does not move such as a door locking device of a house, a wired connection to the authentication station 5 is also possible.

The principal role of the authentication station 5 is that of associating the portable communication terminal 3 and wearable key unit 4 and associating the door unlocking control device 10 and portable communication terminal 3 to establish a usable state. The authentication station 5 also plays the role of providing authentication with respect to whether communication for the sake of confirmation may be performed by the portable communication terminal 3 and wearable key unit 4 with the authentication station 5 and whether the door unlocking control device 10 may be released when the door unlocking control device 10 is in a restricted usage release state as a result of the portable communication terminal 3.

In addition, if we now provide an overview of the authentication operation of the constitution of the embodiment of the invention shown in FIG. 2 for which an application was submitted previously, wireless authentication is performed between the wearable key unit 4 and portable communication terminal 3 and the usage restrictions of the portable communication terminal 3 are cancelled (step S1).

In a state where the usage restrictions of the portable communication terminal 3 have been cancelled, the portable communication terminal 3 and the door unlocking control device 10 which is the controlled device also perform wireless authentication (step S2). If the wireless authentication between the portable communication terminal 3 and door unlocking control device 10 operate normally, the authentication result is sent to the authentication station 5 from each of the portable communication terminal 3 and door unlocking control device 10 (steps S3, S4).

An authentication station D registers the IDs in association. Therefore, if the authentication result from the portable communication terminal 3 and door unlocking control device 10 is confirmed and the ID association is confirmed, it is judged that the authentication result is legitimate. Further, an unlocking permission signal is sent to the door unlocking control device 10 of the automobile 1 which is the controlled device and the door unlocking control device 10 releases the usage restrictions upon receipt of the unlocking permission signal and unlocks the door.

Here, in the ubiquitous society of mobile communications, it is natural that a need to perform personal authentication as a basic technology has arisen. However, the authentication systems of previous applications basically involve mutual authentication between devices that is carried out by the devices and do not include personal information for operating the devices.

Therefore, in the inventions disclosed in previous applications, the personal authentication systems are inadequate in a strict sense.

DISCLOSURE OF THE INVENTION

Based on this fact, an object of the present invention is to provide a wireless authentication method and wireless authentication system in which personal information for operating the device of the present invention is combined with wireless authentication.

A further object of the present invention is to provide a wireless authentication system and personal characteristic information that is able to uniquely specify an individual as personal information.

A wireless authentication method according to the present invention that achieves the above objects is, according to a first aspect, a wireless authentication method for a wireless authentication system having a first communication device and a second communication device which communicates interactively with one another by a wireless line, a controlled device for which the cancellation of usage restrictions is controlled by the first communication device, and an authentication station which communicates interactively by a wireless line between the first communication device and the controlled device; wherein the authentication station storages respective distinctive IDs of the first communication device, the second communication device, and the controlled device, and personal specification information of a user using the first communication device corresponding to the distinctive ID. Further, the wireless authentication method having the steps of: performing a first authentication processing for a second communication device, by checking received identification information against identification information stored in an internal storage unit of a first communication device, when the first communication device judges that a transmission signal level from the second communication device is equal to or more than a predetermined value, and receives the identification information identifying the second communication device from the second communication device; reporting to a remote authentication station an authentication result including the identification information, when the first communication device succeeds the authentication of the second communication device by performing the first authentication processing, by the first communication device; performing a second authentication processing for the second communication device, by checking the identification information including the authentication result against identification information stored in an internal storage unit of the authentication station, by the authentication station; transmitting to the first communication device a cancellation permission signal to cancel the usage restrictions of a controlled device whose usage is restricted by the first communication device, when the authentication of the second communication device by the second authentication processing is successful, by the authentication station; requesting personal specification information on the user to the second communication device, by the first communication device; sending fingerprint information sent by the second communication device to the authentication station, by the first communication device; performing a third authentication processing for the second communication device, by checking a correspondence relationship between the personal specification information and the identification information stored in the internal storage unit of the authentication station, by the authentication station; and sending to the first communication device confirmation signal indicating that a person's identity is confirmed, when the authentication station succeeds the authentication of the second communication device, by the authentication station, so that the authentication station validates the cancellation of the usage restrictions of the controlled device imposed by the first communication device based on the cancellation permission signal.

The wireless authentication method according to the present invention that achieves the above object is, according to a second aspect, the wireless authentication method according to the first aspect, wherein the authentication station sends to the controlled device the confirmation signal indicating that a person's identity is confirmed at the same time, when the authentication station succeeds the third authentication processing; and the controlled device validates the cancellation of the usage restrictions for the controlled device imposed by the first communication device, when the controlled device receives the confirmation of a person's identity from the first communication device and the authentication station.

The wireless authentication method according to the present invention that achieves the above object is, according to a third aspect, the wireless authentication method according to the first or second aspect, wherein the personal specification information is divided into a first part and a second part and stored in the first communication device and the second communication device respectively; and the personal specification information sent to the first communication device from the second communication device is the second part and the first communication device combines the second part of the personal specification information sent from the second communication device with the first part of the personal specification information and sends to the authentication station as personal specification information on the user.

The wireless authentication method according to the present invention that achieves the above object is, according to a fourth aspect, the wireless authentication method according to the third aspect, wherein the personal specification information is fingerprint information for the user.

The wireless authentication method according to the present invention that achieves the above object is, according to a fifth aspect, the wireless authentication method according to the fourth aspect, wherein the fingerprint information is registered by hashing source data.

Furthermore, the wireless authentication method according to the present invention that achieves the above object is, according to a sixth aspect, the wireless authentication method according to the first aspect, wherein, the personal specification information is erased, when the distance between the first and second communication devices for which the transmission signal level from the second communication device is not equal to or more than a predetermined value is maintained for a predetermined time.

The features of the present invention will become more evident from the best modes for carrying out the invention which will be described herein-below in accordance with the drawings.

BRIEF DESCRIPTION OF THE DRAWINGS

FIG. 8A and FIG. 8B illustrate the constitution of an identification signal;

FIG. 9A to FIG. 9C are explanatory diagrams of a pulse compression signal and pulse compression processing;

FIG. 12A to FIG. 12C are explanatory diagrams of an identification signal and transmission timing;

FIG. 15 is an example of an ID management table that is stored in an authentication station 5;

BEST MODE FOR CARRYING OUT THE INVENTION

Embodiments of the present invention will be described hereinbelow with reference to the drawings. However, such embodiments permit an understanding of the present invention and do not limit the technological scope of the present invention.

In addition, according to the embodiments illustrated hereinbelow, the automobile door unlocking control device is illustrated as an example of a controlled device which is a security target. However, the present invention is naturally not limited to an automobile door unlocking control device. The present invention can also be applied to all objects that can be monitored and operated remotely such as a house door lock, a camera, a PDA (Personal Digital Assistant), a personal computer, a cellular phone and so forth.

Figure 1:
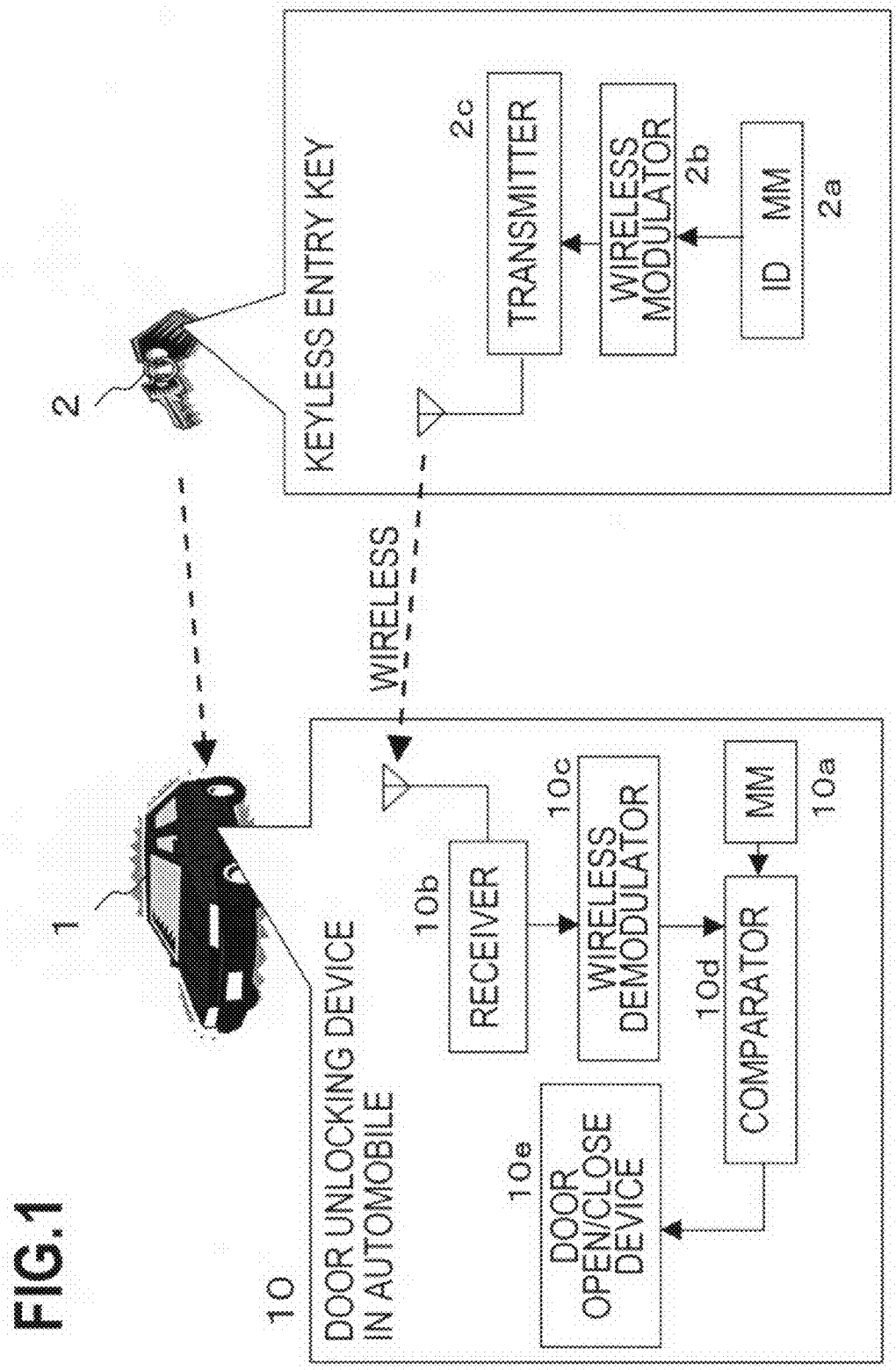
FIG. 1 shows an example in which a portable communication terminal is used for an identification device used for personal authentication.
Figure 2:
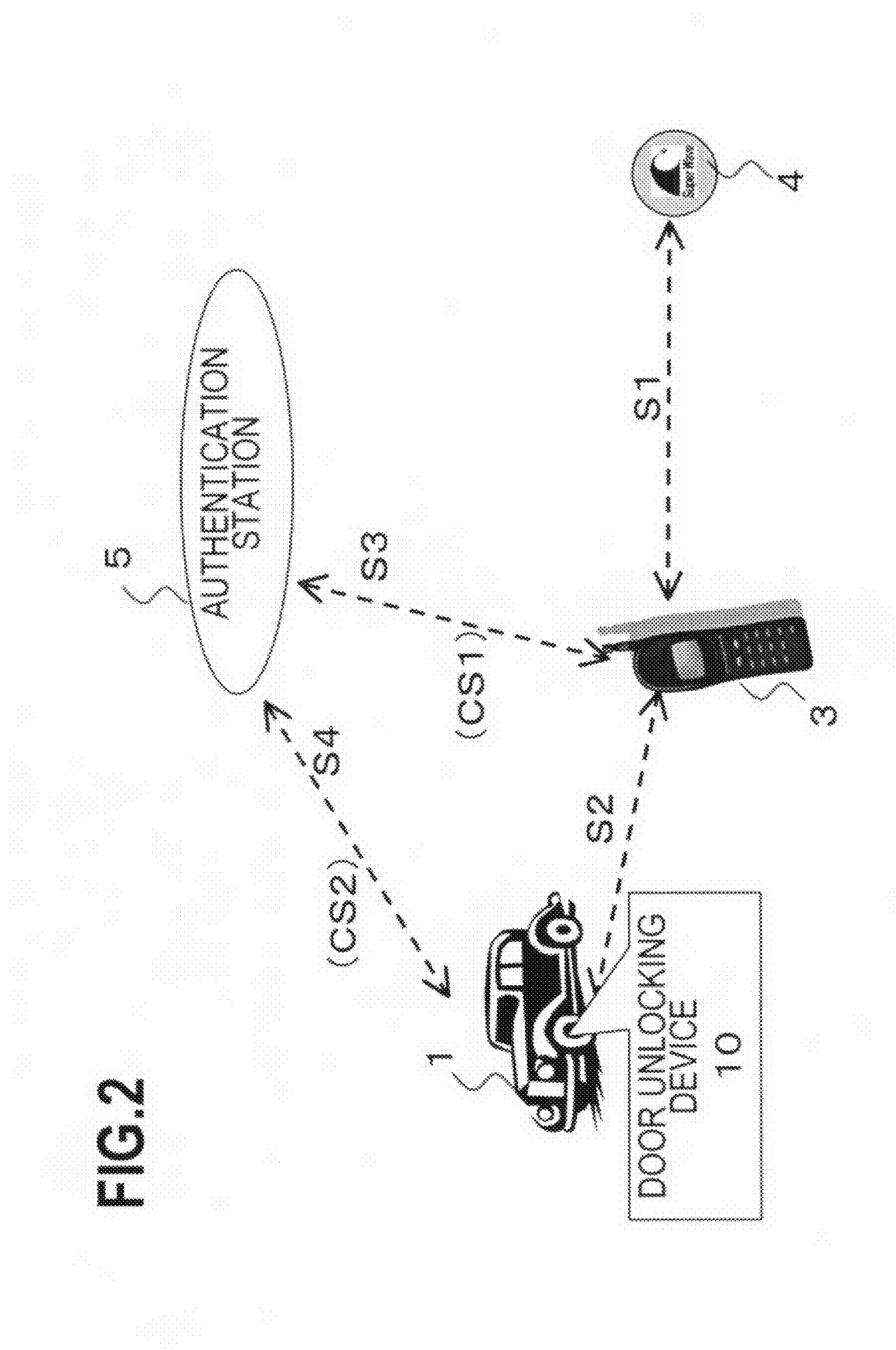
FIG. 2 illustrates a wireless authentication system indicated by the prior art.
Figure 3:
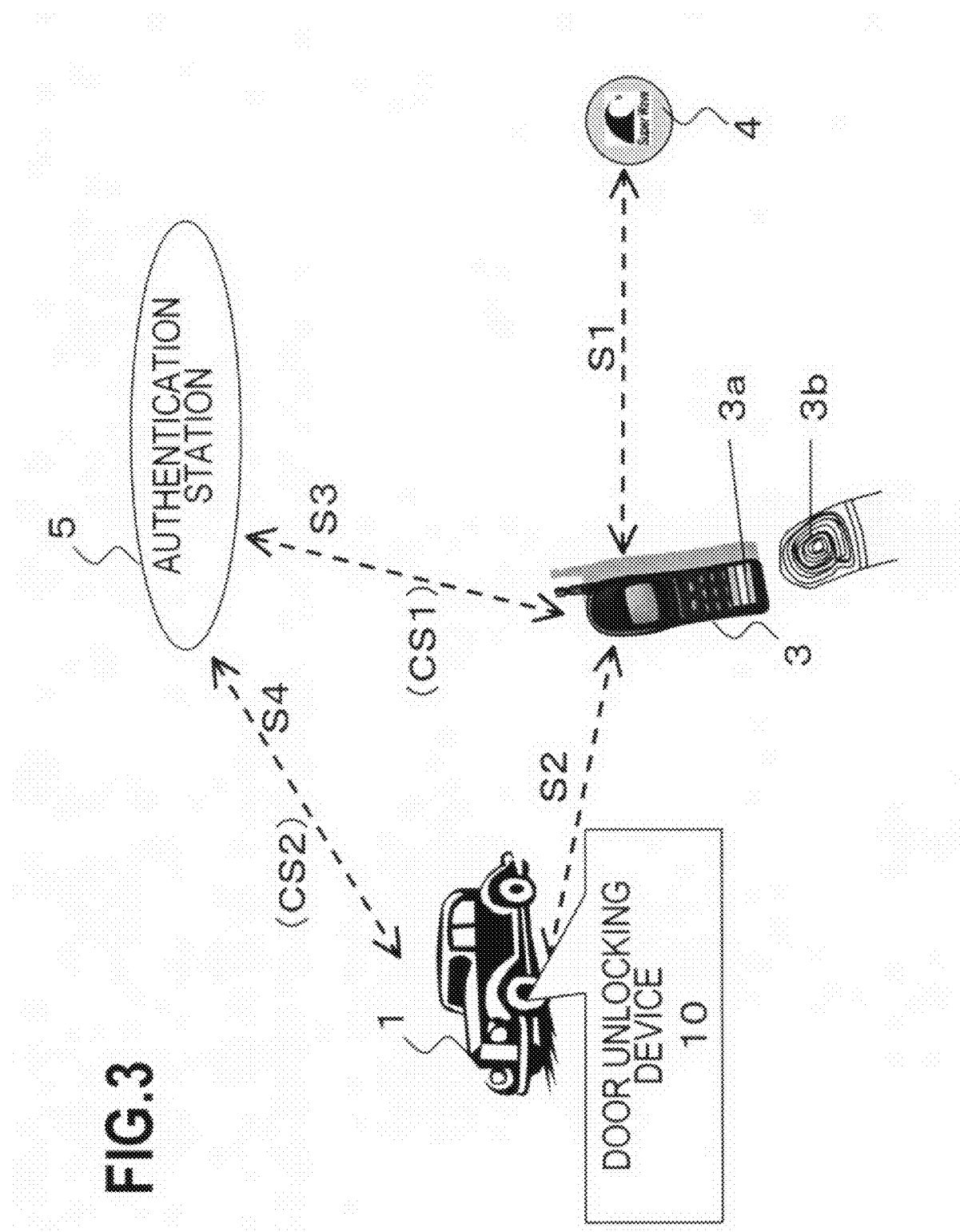
FIG. 3 shows a constitutional example of a wireless authentication system according to an embodiment of the present invention.

FIG. 3 shows a constitutional example of a wireless authentication system according to an embodiment of the present invention. In contrast to the prior art shown in FIG. 2, FIG. 3 represents an embodiment that is characterized by using fingerprint information as individual characteristic information that is capable of unambiguously specifying an individual who is the user of the portable communication terminal 3.

In FIG. 3, the portable communication terminal 3 is connected to the authentication station 5 by means of a cellular phone line CS1. In addition, a door unlocking control device 10 that is mounted in an automobile 1 which is a controlled device is also connected to authentication station 5 by means of a communication line CS2 of a PHS or the like.

According to the present invention, the role of the authentication station 5 is that of making an association between the portable communication terminal 3 and wearable key unit 4 and an association between the portable communication terminal 3 and the door unlocking control device 10 and establishing a state where the unlocking or locking of the door key of the automobile 1 can be controlled remotely by controlling the door unlocking control device 10 by means of the authenticated portable communication terminal 3.

In addition, in cases where the door unlocking control device 10 assumes a restricted usage cancellation state as a result of the portable communication terminal 3, communication for the purpose of authentication from the portable communication terminal 3 and the door unlocking control device 10 is carried out and the authentication station 5 also fulfils the role of providing authentication with respect to whether the door key may be unlocked by means of the door unlocking control device 10.

Data registered in the authentication station 5 are biometrics information such as a unique portable communication terminal ID and the fingerprint of the user and so forth.

Figure 4:
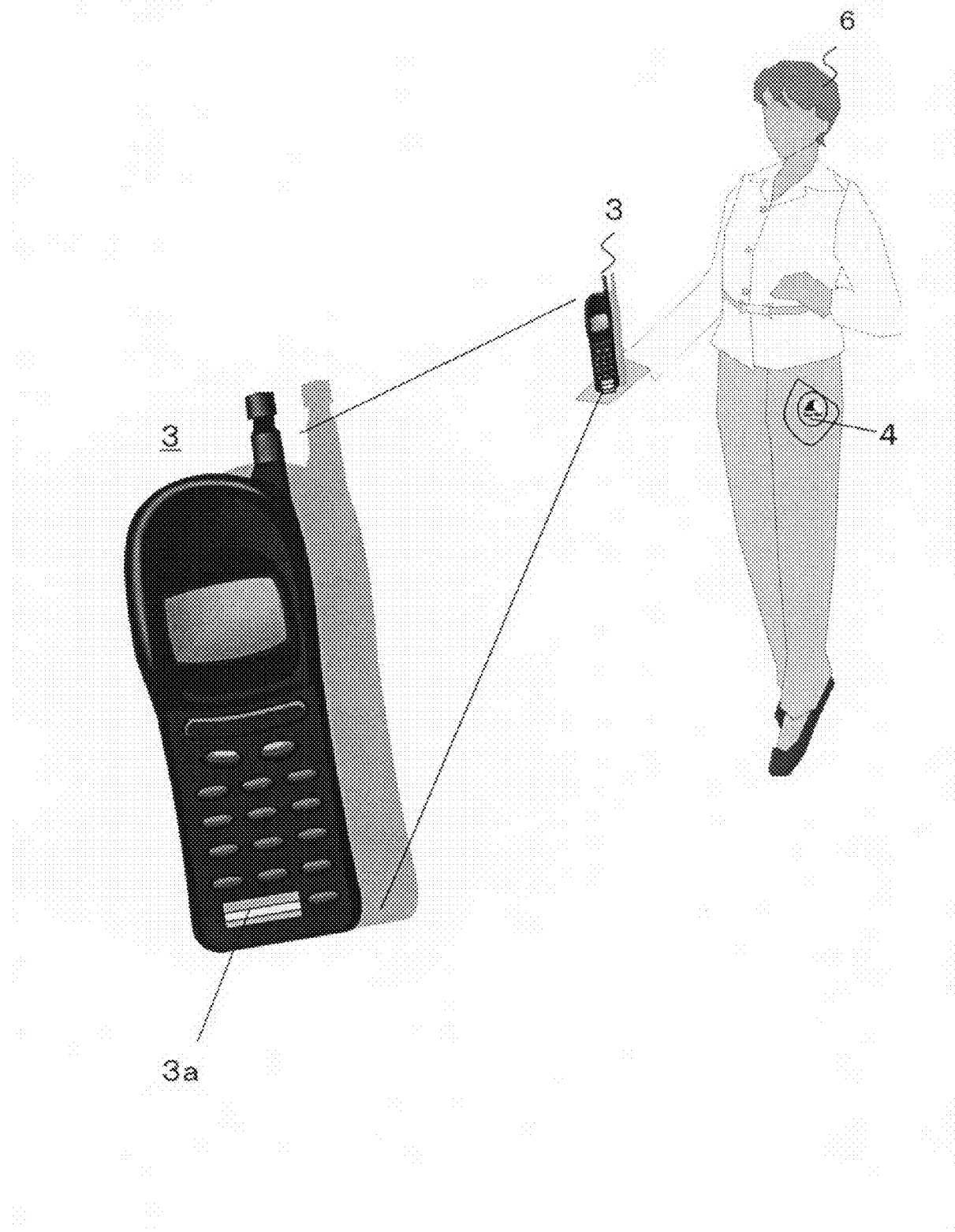
FIG. 4 shows a usage format for the authentication system of the present invention.

Here, the authentication between the portable communication terminal 3 and wearable key unit 4 will be described via FIG. 3. As shown in FIG. 4, which shows the form of usage of the authentication system of the present invention, the portable communication terminal 3, which possesses a communication function (cellular phone terminal, for example), and the wearable key unit 4, which has a key function that enables usage of the portable communication terminal 3 are both owned by an individual who is the user 6.

Figure 5:
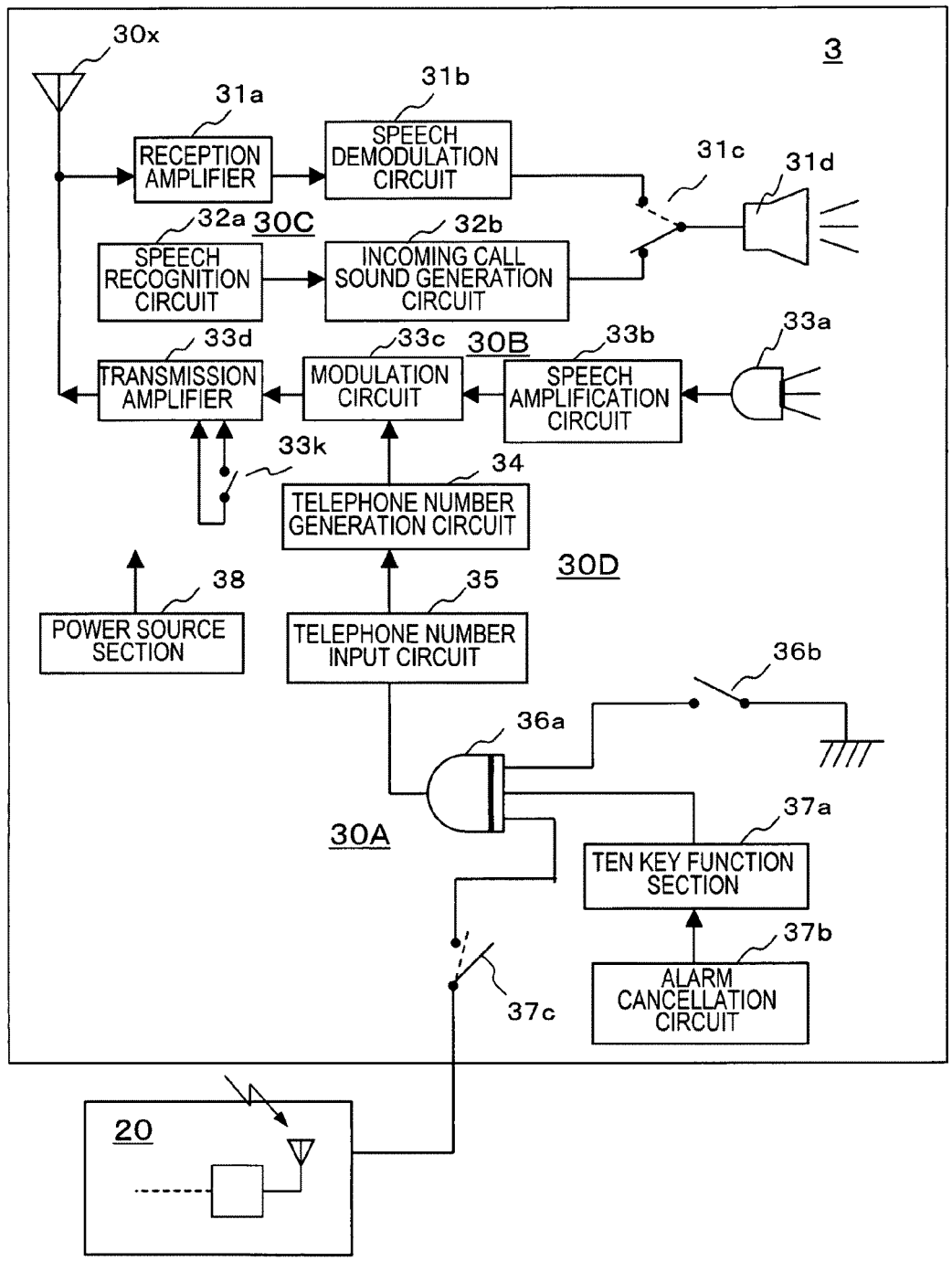
FIG. 5 is an embodiment constitutional block diagram of the portable communication terminal 3.

FIG. 5 is a constitutional block diagram of an embodiment of the portable communication terminal 3. In FIG. 5, the portable communication terminal 3 comprises a transmission unit 40 and a lock release unit 20. The transmission unit 40 further comprises an outgoing call channel 30B, an incoming call channel 30C, a telephone number input channel 30D, and a power source section 38.

In the outgoing call channel 30B, speech is amplified by a speech amplification circuit 33b after being converted into a speech signal by a microphone 33a, whereupon the carrier wave signal is modulated by the modulation circuit 33c and the modulated signal is then power-amplified by the transmission amplifier 33d before being transmitted to the call station from a send/receive antenna 30x. A call switch 33k is provided in the transmission amplifier 33d and an outgoing call mode is set when the call switch 33k is operated.

In the incoming call channel 30C, an incoming call activation signal is amplified by the reception amplifier 31a and number identification is carried out by the number identification circuit 32a before an incoming call sound from the incoming call sound generation circuit 32b is emitted from a speaker 31d via a hook switch 31c. The call enters speech input mode when the hook switch 31c is switched on the basis of the incoming call sound and a reception signal that has been amplified by the reception amplifier 31a is demodulated as a speech signal by the speech demodulation circuit 31b such that the speech signal is sent to the speaker 31d via hook switch 31c and is played back as speech.

The circuit is connected so that, in the speech number input channel 30D, the operation signal of the key operation invalidation switch 36b and the signals of the ten-key function section 37a and switch 37c are input to an AND gate 36a of the restricted usage circuit 30A. The switch 37c is operated in accordance with the output of an alarm cancellation circuit 37b based on a PIN number that is input using the ten-key function section 37a. If a telephone number input mode is set on condition that the signals from the switches 36b and 37c and the restricted usage cancellation signal from the lock release unit 20 are established, the telephone number input from the ten-key function section 37a is sent to the telephone number input circuit 35 via the gate 36a and, after passing through the telephone number generation circuit 34, is transmitted from the send/receive antenna 30x via the modulation circuit 33c and transmission amplifier 33d.

Further, the power source of the power source section 38 is operated by the power source switch (not illustrated here) of the portable communication terminal 3 and power is supplied to the circuits of the respective channels. However, the power source may also be common to the lock release unit 20 that will be described subsequently for this embodiment or another independent power source may be provided in the lock release unit 20. In cases where a common power source of this kind is used, power is always supplied to the lock release unit 20 even when the power source switch of the portable communication terminal 3 is shut off. This will be explained subsequently.

Figure 6:
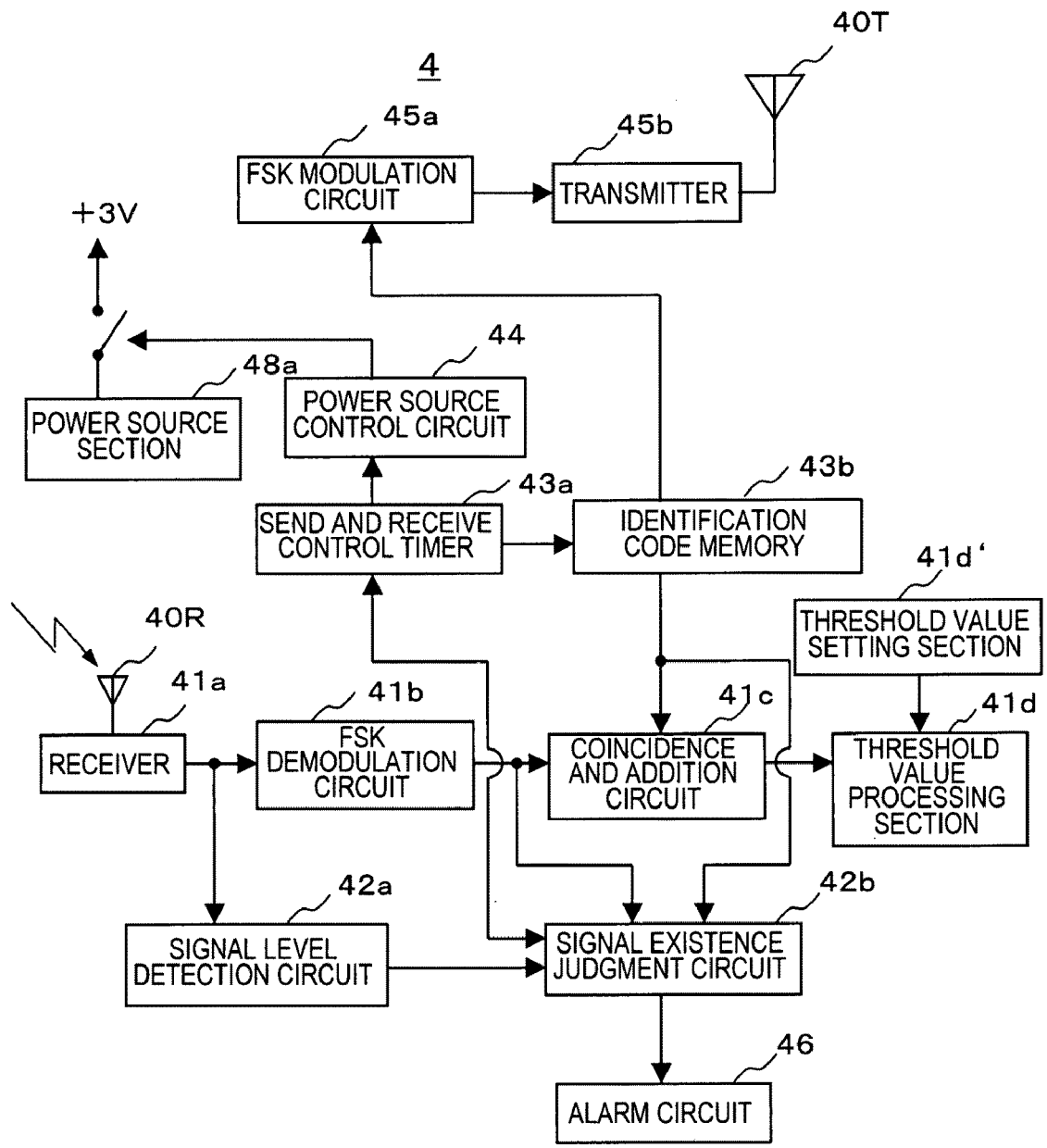
FIG. 6 shows a block diagram of a constitutional example of a wearable key unit 4.

FIG. 6 shows a constitutional example block diagram of the wearable key unit 4. The wearable key unit 4 comprises a transmitter 45b that transmits, from a transmission antenna 40T, an identification signal including an intrinsic code signal that is preset and a receiver 41a that receives, via a reception antenna 40R, a confirmation signal that is sent back by the transmitter of the lock release unit 20 (described subsequently).

The transmission channel that transmits an identification signal sends the identification signal that is set for the identification code memory 43b by means of a command from the send/receive control timer 43a and, after the carrier wave is FSK-modulated (250 MHz) by an FSK modulation circuit 45a, the transmission signal of the identification signal from the transmitter 45b is transmitted by the transmission antenna 40T.

The power source section 48 supplies power to each section by closing switch 48a by means of a signal from the power control circuit 44.

The reception channel that receives the confirmation signal has the following constituent elements connected downstream of the receiver 41a. First, the received confirmation signal (250 MHz) is FSK-demodulated by the FSK demodulation circuit 41b and then sent to the coincidence and addition circuit 41c. The coincidence and addition circuit 41c reads an identification signal that is pre-stored in an identification code memory 43b and adds the points of coincidence for each bit in order to judge whether the confirmation signal coincides with the identification signal.

The added output signal (pulse compression signal which will also be described subsequently) is output to the threshold value processing section 41d and, in the threshold value processing section 41d, the output signal is compared with a threshold value that is preset by a threshold value setting section 41d' and, if the output signal exceeds the threshold value, the timing signal is sent to a signal existence judgment section 42b.

Meanwhile, the confirmation signal received by the receiver 41a is also sent to a signal level detection circuit 42a and a signal representing the signal level detected by this circuit is sent to the signal existence judgment section 42b. The confirmation signal from the FSK demodulation circuit 41b and the identification code signal from the identification code memory 43b are also input to the signal existence judgment section 42b.

The signal existence judgment section 42b judges whether the confirmation signal and identification code signal coincide and judges, after receiving a timing signal from the threshold value processing section 41d, whether the signal level of the confirmation signal received within a fixed time t is equal to or more than a fixed value. An output signal is not emitted unless these two judgments are both satisfied. However, when it is judged that the above coincidence judgment is established and that the signal level is equal to or less than a fixed value, an alarm signal is output to the alarm circuit 46.

Figure 7:
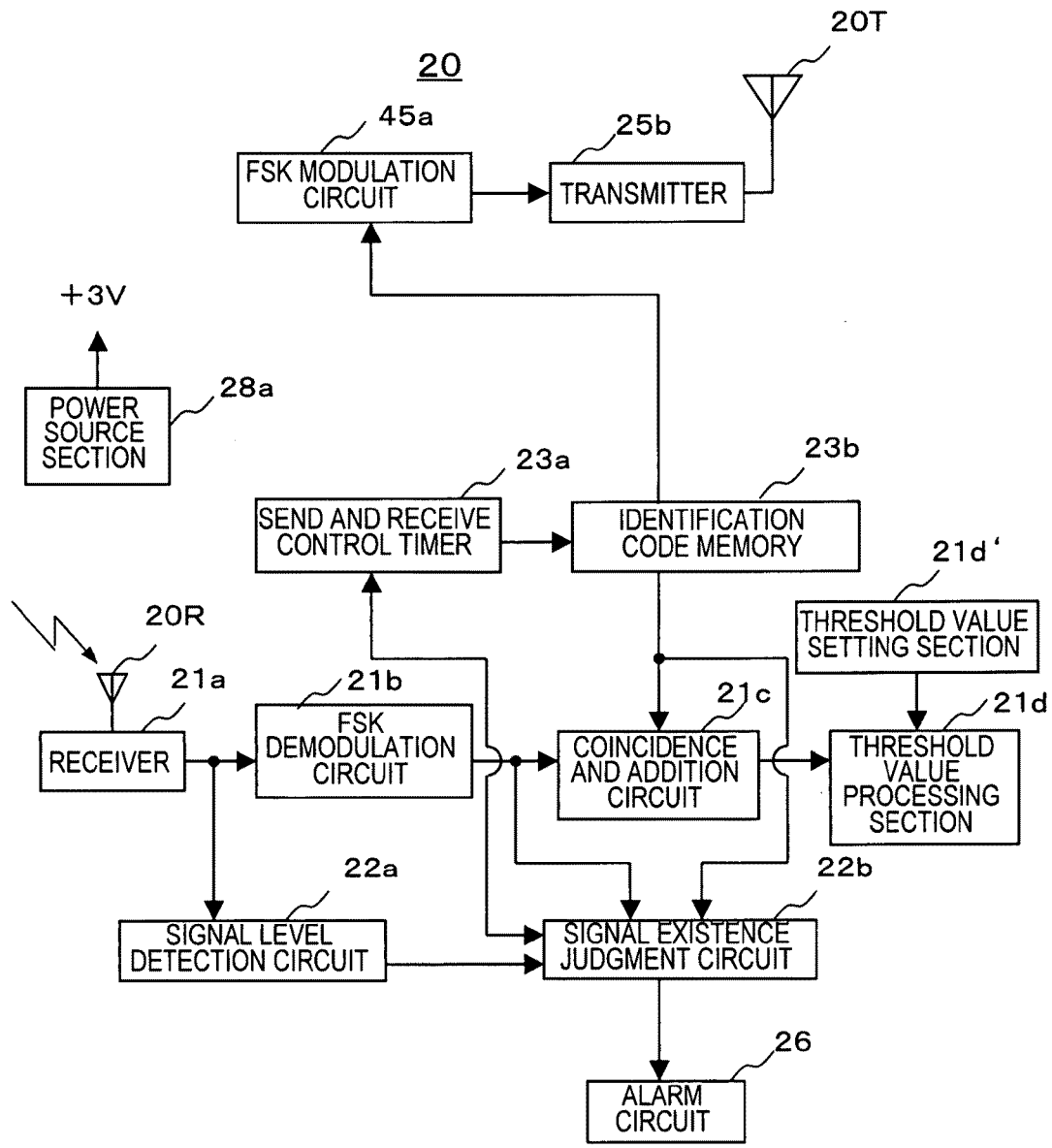
FIG. 7 shows a constitutional example of a lock release unit 20 that is mounted in the portable communication terminal 3.

FIG. 7 shows a constitutional example of the lock release unit 20 that is mounted in the portable communication terminal 3. The basic constitution of the lock release unit 20 is, as illustrated, substantially the same as the constitution of the wearable key unit 4 in FIG. 6 but slightly different in parts. These different parts will be the focus of the following description.

The fact that the existence of a signal is judged by the signal existence judgment section 22b based on an identification signal that is sent by the wearable key unit 4 and the signal existence judgment section 22b does not output any signal unless an identification signal is received is the same as for the wearable key unit 4. However, the difference lies in the fact that, if there is no output signal, a restricted usage cancellation signal is always generated by a restricted usage cancellation signal generation section 26 and the transmission of the cancellation signal by the restricted usage cancellation signal generation section 26 is stopped by an output signal from the signal existence judgment section 22b when an identification signal is no longer received.

In addition, the power of the power source section 28 is not subject to control by the send/receive control timer 23a and is always sent to the respective constituent sections, such that the supply of power is not shut off by the power source switch regardless of whether the power source of the portable communication terminal 3 is shared or not shared.

This is because, if an identification signal is transmitted from the wearable key unit 4 as will be described subsequently, the transmission of the identification signal is always received by the lock release unit 20 at any time and there is a need to always turn ON the power source of the lock release unit 20 in order to always send back, at fixed intervals, a confirmation signal via the transmission channel of the lock release unit 20 by means of an instruction from the send/receive control timer after judging the existence of an identification signal on the basis of this signal.

The other constituent members are basically the same as the wearable key unit 4 in FIG. 6 and the same constituent elements are assigned the same twenty suffix numbers and a description thereof is omitted here.

In the description of the respective constituent members, the identification signal from the wearable key unit 4 is a signal that includes a preset intrinsic code signal. However, as shown in FIG. 8A and FIG. 8B, the identification signal consists of a maximum length null sequence (M sequence) signal and a successive intrinsic code signal of a telephone number of the portable communication terminal 3 (referred to simply as the 'telephone number' hereinbelow). The inclusion of the M sequence signal in the identification number in addition to the telephone number is, as will be described subsequently, for the sake of creating a signal with favorable conditions during characteristic circuit processing to identify whether the reception signal is its own portable communication terminal upon receipt of the identification number.

Further, the identification signal is transmitted as an intermittent signal that is repeated each optional time interval S seconds (2000 ms, for example) where the M sequence signal and the telephone number signal are taken as the units. This is for the sake of brownouts and to prevent and stabilize battery consumption and enable long-term transmission. The M sequence signal may be a C/A code, a P code, and a linear FM signal and so forth. Alternatively, the telephone number constituting the intrinsic code signal may also be another ID number for a device other than a cellular phone, or a signal representing information for another owner or administrator.

The M sequence signal may be one type of binary pseudo irregular signal and is a code string consisting of 1s and 0s with a length obtained by subtracting 1 from $2^n$, that is, the length $(2n-1)$. For example, if n=5, this is a 31 bit signal. If the M sequence signal is sent to the coincidence and addition circuit 11c, a pulse compression signal and a pulse compression signal that is denoted by B in FIG. 9A to FIG. 9C which are explanatory diagrams for the pulse compression processing is obtained. The M sequence signal which is the input signal in this pulse compression undergoes 1/31 signal compression.

Further, the above intrinsic signal is required in a quantity that corresponds to the number of sales points of the portable communication terminal. However, in the case of an m-bit length code length, there can be 2m types. There can, for example, be approximately a billion types of intrinsic code signals if m=30, for example. Although the characteristic code signal is a telephone number in this embodiment, other ID numbers are naturally also possible. If the M sequence signal and intrinsic code signal are stored beforehand as the identification signal in an identification code memory, unauthorized usage when the device is mislaid or stolen can be effectively prevented.

Figure 10:
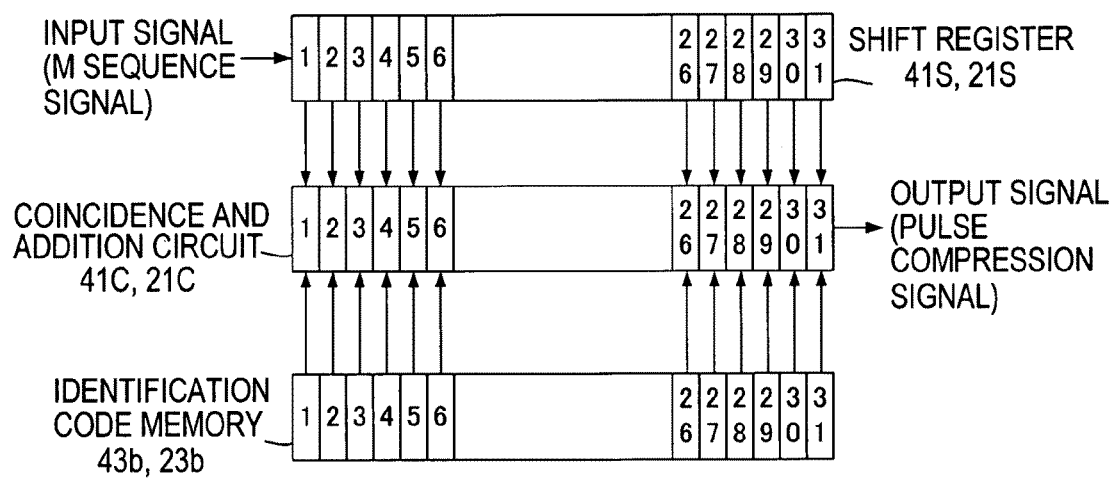
FIG. 10 shows a detailed constitutional example of a coincidence and addition circuit 41c (21c)

The details of a constitution according to which the identification signal is transmitted by the wearable key unit 4 and received by the lock release unit 20 and the same signal is sent back by the lock release unit 20 as a confirmation signal after a fixed time interval has elapsed based on the original identification signal before the signal received by the wearable key unit 4 undergoes pulse compression processing by the coincidence and addition circuit 41c of the wearable key unit 4 will be provided by FIG. 10 which is a detailed constitutional example of the coincidence and addition circuit 41c (21c).

If the reception signal for which the confirmation signal is received is demodulated by the FSK demodulation circuit 41b, the leading M sequence signal in the confirmation signal is temporarily stored in a shift register 41s that is not illustrated in FIG. 6.

The M sequence signal written to the shift register 41s is sent to the coincidence and addition circuit 41c where the M sequence signal in the storage data that are pre-stored in the identification code memory 43b is called up. The two M sequence signals are compared for coincidence for each bit and the coinciding bit count is added.

The coincidence and added signal is output as a pulse compression signal. Further, in this example, the shift register 41s has a 31 bit storage capacity but the identification code memory 43b stores both the M sequence signal (31 bits) and the intrinsic code signal (29 bits) and, therefore, has a storage capacity of 60 bits. Hence, during the processing of the two M sequence signals, the data part of the M sequence signal is called.

Figure 11:
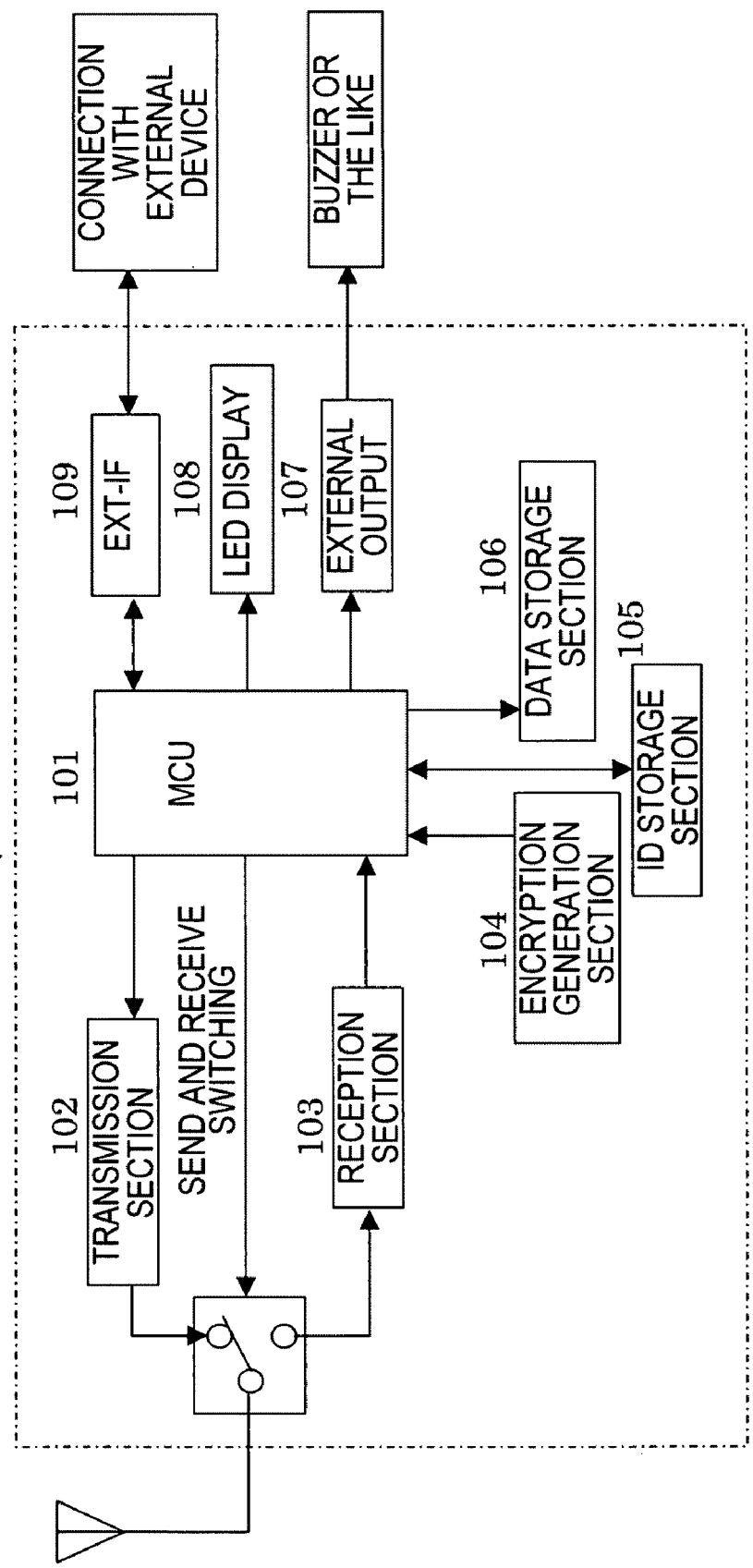
FIG. 11 shows a specific constitutional example of the wearable key unit 4 and lock release unit 20.

FIG. 11 shows a specific constitutional example of the wearable key unit 4 and lock release unit 20.

The wearable key unit 4 and lock release unit 20 is implemented by the communication module 100 that has an MCU (Micro Controller Unit) at the center thereof. The communication module 100 with the constitution in FIG. 11 is known as a multitask communication module (MTC module). The relationships between the respective parts of FIG. 11 and the respective parts of FIGS. 6 and 7 will now be described. The transmission section 102 in FIG. 11 corresponds to the transmitter 45*b* of the wearable key unit 4 in FIG. 6 and the transmitter 25*b* of the lock release unit 20 in FIG. 7.

The reception section 103 in FIG. 11 corresponds to the receiver 21*a* of the lock release unit 20 in FIG. 7 and the receiver 41*a* of the wearable key unit 4 in FIG. 6. The encryption generation section 104 in FIG. 11 is not shown in FIGS. 6 and 7 but performs processing to encrypt the respective identification codes of the wearable key unit 4 and lock release unit 20. The identification code is sent and received in an encrypted state.

An ID storage section 105 in FIG. 11 corresponds to the identification code memory 43*b* of the wearable key unit 4 in FIG. 6 and the transmitter 23*b* of the lock release unit 20 in FIG. 7. A data storage section 106 is not illustrated in FIGS. 6 and 7 but, as will be described subsequently, stores required information such as the action history which is the history of communication between the wearable key unit 4 and lock release unit 20.

The external output 107 in FIG. 11 and the LED display section 108 operate as the warning circuit 46 of the wearable key unit 4 in FIG. 6. The lock release unit 20 may be used or not used in another application.

The EXT-IF 109 in FIG. 11 is an interface with an external device which operates as a restricted usage cancellation signal generation section 26 of the lock release unit 20 in FIG. 7. Further, the MCU 101 in FIG. 11 executes processing carried out by respective parts other than the aforementioned part in the wearable key unit 4 of FIG. 6 and the lock release unit 20 of FIG. 7.

The description of the action of the restricted usage device that is applied to the portable communication terminal of the embodiment with the above constitution will be divided between the action of the wearable key unit 4 and the action of the lock release unit 20. First, in cases where the identification signal is transmitted from the wearable key unit 4, when the power source switch (not illustrated) is thrown, the send/receive control timer 43*a* is immediately set and the switch 18*a* is closed via the power source control circuit 44*a* such that power is supplied to each section from the power source section 48.

As shown in time charts FIG. 12A and FIG. 12B which are explanatory diagrams to explain the identification signal and transmission timing, when 2 ms have elapsed after the supply of power is turned ON, transmission takes place via transmission antenna 40T from the transmitter 45*b* after the identification signal has been read from the identification code memory 43*b* in accordance with an instruction from the control timer 43*a* and modulated by the FSK modulation circuit 45*a*.

The transmission of the identification signal is carried out by FSK modulating a 31 bit M sequence signal and a 29 bit intrinsic code signal that indicates a successive intrinsic telephone number, as mentioned earlier.

The transmission signal of the identification signal from the wearable key unit 4 is of a predetermined level or higher and is received by a lock release unit 20 of the portable communication terminal 3 and, when the identification signal is identified as being its own, a transmission signal that is the same as the identification signal is sent back by the lock release unit 20 and received as a confirmation signal.

The transmission and reception timing is as shown in FIGS. 12A to 12C and the power source of the wearable key unit 4 is ON for a period calculated as follows: time for activation (2 ms)+time for transmission (6 ms)+lag time (2 ms)+time to send signal back (6 ms)+the lag time (2 ms)=total of 18 ms.

Thereafter, the transmission timing is controlled by a control timer 13*a* such that same is ON during a fixed time which is 2000 ms, for example, after the initial power source ON after a fixed time has elapsed. Because the subsequent processing that will be described subsequently is not carried out even when the signal transmitted by the wearable key unit 4 is received by the receiver 41*a* of the wearable key unit 4 at the same time, an alarm signal is not sent to the alarm circuit 46 based on the reception signal and so forth and is not made to act as the original reception signal, being distinct from the confirmation signal.

However, when the confirmation signal that is sent back with predetermined timing from the lock release unit 20 is received by the receiver 41*a*, the demodulation thereof by the FSK demodulation circuit 41*b* followed by the pulse compression processing by the coincidence and addition circuit 41*c* takes place as per the earlier description with reference to FIG. 11.

Although the M sequence of signal A shown in FIG. 9A in the confirmation signal is pulse-compression processed in the pulse-compression processing, as indicated by code B, the signal that has been subjected to coincidence and addition processing is such that, before the pulse string of the M sequence signal is completely written to a shift register 11*s* or, even thereafter, the data of each bit in the course of this process partially coincide with the values of the respective corresponding bits of the M sequence signal storage data of the identification code memory and, therefore, the value of the pulse compression signal always fluctuates. However, if the data that coincide with the M sequence signal stored in its own identification code memory 43*b* are written to the shift register 41*s*, as long as the number of bits subjected to the coincidence and addition processing by the coincidence and addition circuit 41*c* is completely established for the total bit count 31 of a shift register 43*s*, the pulse compression signal is 31 and there exists complete coincidence for the M sequence signal or, as long as the number of bits that have been at least subjected to coincidence and addition processing is 24 or more, the two M sequence signals can be regarded as coinciding.

Therefore, the threshold value processing section 41*d* judges whether the pulse compression processing signal exceeds a threshold value that is preset by the threshold value setting section 41*d'* and is 24 or more, for example (See FIG. 9B) and, when it is judged that the threshold value is exceeded, outputs the timing signal in FIG. 9C to the signal existence judgment section 12*b*.

Figure 13A:
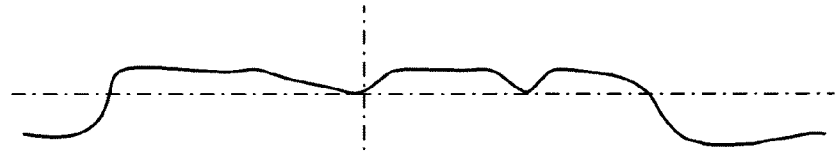
FIG. 13A to FIG. 13C are explanatory diagrams of the relationship between the detected waveform and confirmation signal of the reception signal.
Figure 13B:
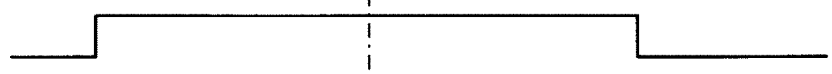
Figure 13C:
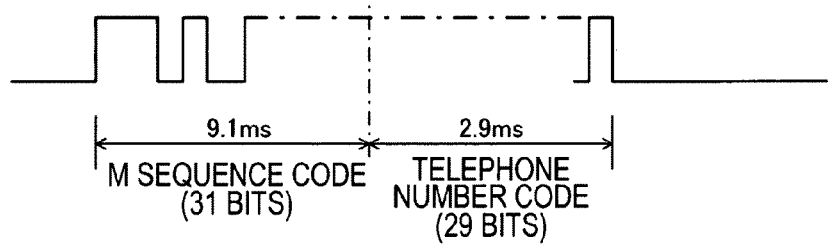

Further, as mentioned earlier, the signal level of the reception signal received by the receiver 41*a* is detected by the signal level detection circuit 42*a* and it is judged by the signal existence judgment section 42*b* whether the signal level is equal to or more than a fixed value. In FIG. 13A to FIG. 13 C, which are explanatory diagrams of the relationship between the reception signal detection waveform and the confirmation signal, the judgment of the signal level is a judgment in which a certain voltage threshold value is provided for the reception signal of the detection waveform shown in FIG. 13A and, if the signal level is equal to or more than the threshold value, it is judged that a signal equal to or more than the fixed level has been received.

Figure 14:
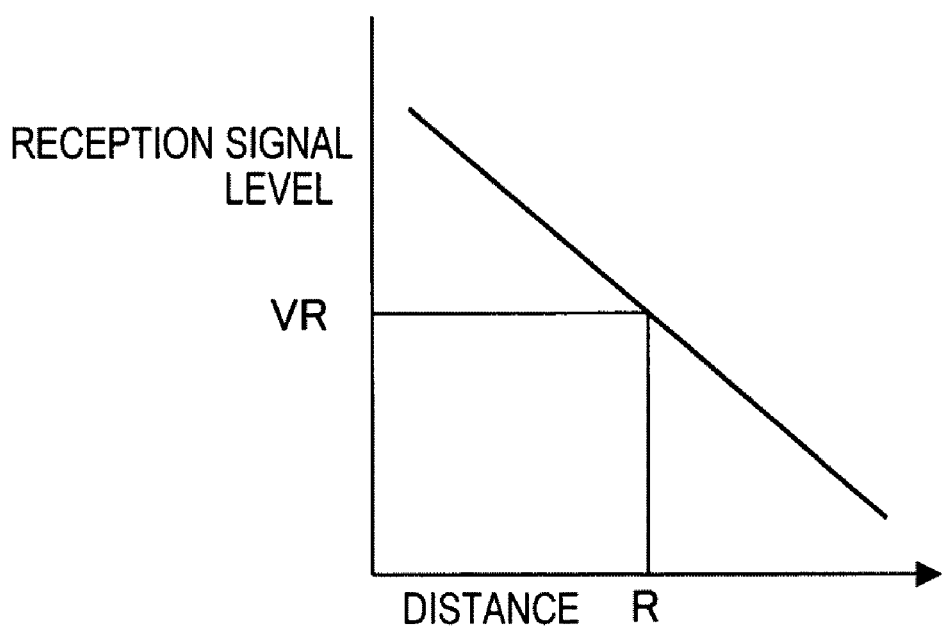
FIG. 14 is an explanatory diagram of the reception signal level and level judgment interval.

The above judgment, is based on the fact that, if the distance R between the wearable key unit 4 and the lock release unit 20 is large upon receipt of a signal that is transmitted with a fixed intensity, the reception signal level drops in an inverse proportion to this distance to the power of two, as shown in FIG. 14, which is an explanatory diagram for the reception signal level and level judgment interval. As one method of judging this fact, the threshold value is determined in correspondence with the predetermined distance (one meter, for example) and, if the received signal level is equal to or less than a threshold value, it can be detected that the wearable key unit 4 and the lock release unit 20 are spaced apart at or above a predetermined distance. Further, FIG. 14 is shown with a logarithmic scale.

Instead of the above judgment method, the level of the reception signal may also be learned by measuring the voltage level of the reception signal by way of A/D conversion of the reception signal detection waveform.

The judgment of the signal level is performed by making symmetrical only the fixed time t (2.9 ms in the illustrated example) that corresponds with the intrinsic code signal that is received after the timing signal after threshold value-processing the M sequence signal has been sent from the threshold value processing section 11d. This is so that noise and a signal level from another telephone are not detected and because the judgment can be performed accurately by making the fixed time specified by the timing signal the judgment interval.

In addition to the judgment of the signal level, the judgment of the signal existence judgment section 42b is also performed to determine whether there is coincidence between the FSK-modulated intrinsic code signal that is received after the timing signal is input and the intrinsic code signal that is stored in the identification code memory. Therefore, the signal existence judgment section 42b receives a timing signal input and a fixed time thereafter receives a reception signal of a predetermined level and, when it is judged that the received intrinsic code signal coincides with its own intrinsic code signal, the lock release unit 20 exists within a fixed distance from the wearable key unit 4 and the signal existence judgment section 42b does not output any kind of signal.

However, even when there is a timing signal input and the intrinsic code signal does not coincide with its own intrinsic code signal, if the signal level is equal to or less than a fixed level, the lock release unit 20 is a fixed distance or more from the wearable key unit 4 and, in this case, an output signal is output and the alarm circuit 46 is made to operate.

Further, in addition to a system in which the alarm emitted by the alarm circuit 46 supplies a speech message, the system used may be any kind of system in which an alarm sound such as a 'beep' or an alarm that displays a display such as 'do not leave behind' on a display device in addition to the alarm sound is provided by some means or other. Further, even when a signal other than the confirmation signal for its own intrinsic code signal is received, because any of the above three conditions or a few conditions are not established, the signal existence judgment section 42b does not output an output signal and it need not be explained that there is no effect on the reception operation of the transmission unit.

Thereafter, the action of the lock release unit 20 is as follows. As described earlier, in unit 20, because power is always supplied to the respective constituent members from the power source section 28 irrespective of whether the power source switch of the portable communication terminal 3 is ON or OFF, when an identification signal is transmitted from the wearable key unit 4, the identification signal is received substantially at the same time by the receiver 21a of the lock release unit 20.

The fact that the identification signal thus received is demodulated by the FSK demodulation circuit 21b and sent to the coincidence and addition circuit 21c and that the M sequence signal-based timing signal is sent from the threshold value processing section 21d to the signal existence judgment section 22b is the same.

Furthermore, the fact that the signal level of the received signal is detected by the signal level detection circuit 22a, the timing signal is sent to the signal existence judgment section 22b, and it is judged whether the signal level is equal to or more than a fixed level within a fixed judgment time t is also the same.

Furthermore, the fact that the signal existence judgment section 22b judges, during the judgment time, whether a transmitted signal coincides with its own intrinsic code signal that is pre-stored in the identification code memory 23b is also the same as for the case of the wearable key unit 4. However, the signal existence judgment section 22b of the lock release unit 20 does not output any output signal when three conditions, namely that the timing signal, and, in two judgments, the signal level is equal to or more than a fixed level and the intrinsic code signals coincide are satisfied.

Unless the above output signal does not exist, the lock release unit 20 and, therefore, the portable communication terminal 3 are not spaced apart from the wearable key unit 4 and are in the hands of the owner or user and a restricted usage cancellation signal is always output by the restricted usage cancellation signal generation section 26. Therefore, the portable communication terminal 3 is always in a usable state.

Further, if an identification signal is received and a fixed time (2 ms in this example) has elapsed in the judgment processing with respect to the existence of a signal by the signal existence judgment section 22b, the send/receive control timer 23a is set by the signal from the signal existence judgment section 22b at that moment and exactly the same signal as the received identification signal is read from the identification code memory 23b and transmitted via the FSK modulation circuit 25a and transmitter 25b. This signal is received as a confirmation signal by the wearable key unit 4 as mentioned earlier.

However, if the lock release unit 20 is separated from the portable communication terminal 3 and also the wearable key unit 4 by a distance equal to or more than the fixed distance as a result of being left behind or stolen, the signal level is equal to or less than a fixed value in the signal level detection and the signal existence judgment section 22b judges that the identification signal has not been received. When this judgment is carried out, the output signal is output from the signal existence judgment section 22b and the output of the usage cancellation signal from the cancellation signal generation section 26 is halted. Hence, the portable communication terminal 3 can no longer be used.

As mentioned earlier, because the restricted usage device of this embodiment is used as an integrated device as a result of the owner or user putting the wearable key unit 4 in their pocket or the like and the lock release unit 20 being combined with the portable communication terminal 3 that is in their possession, unexpected, unauthorized usage and so forth is prevented by restricting usage of the portable communication terminal 3 when the lock release unit 20 and the portable communication terminal 3 are separated by a fixed distance or more from the wearable key unit 4. An alarm in the form of speech and so forth is supplied to the owner or user so that it can be immediately confirmed that the portable communication terminal 3 is no longer in their possession.

In the description above, the same code signal (telephone number) is sent and received as the identification signal and the confirmation signal. However, a constitution in which an intrinsic ID is supplied to the wearable key unit 4 and sent and received is acceptable. In other words, in addition to its own ID, the wearable key unit 4 also stores the ID of the lock release unit 20 and the lock release unit 20 also stores the ID of the wearable key unit 4 in addition to its own ID. Further, the wearable key unit 4 transmits its own ID to the lock release unit 20 and the lock release unit 20 may ascertain whether the transmission unit is its own pair by comparing the received ID with the stored ID for the transmission unit.

The lock release unit 20 also similarly transmits its own ID to the wearable key unit 4 and the wearable key unit 4 ascertains whether the lock release unit is its own pair by comparing the received ID with the stored ID for the lock release unit 20.

Here, the present invention is further characterized by storing personal specification information that uniquely specifies an individual as the user of the portable communication terminal 3 to the lock release unit 20, that is, stores biometrics information on the individual in the identification code memory 23b.

Fingerprint information will now be described as an example of individual biometrics information. As shown in FIGS. 3 and 4, the portable communication terminal 3 comprises a fingerprint reading mechanism 3a. The user performs an operation to read their own fingerprint 3b by means of the finger print reading mechanism 3a and stores a code that corresponds with the read fingerprint information in the identification code memory 23b. In higher security cases, the code corresponding to the fingerprint information stored by the lock release unit 20 may be divided and part of the code thus divided may be transmitted to the wearable key unit 4 so that the code is held divided between the wearable key unit 4 and portable communication terminal 3. More will be said on the individual specification information which characterizes the present invention with respect to a confirmation procedure that will be described subsequently.

Information that is stored in the authentication station 5 in the application of the present invention will be described next.

FIG. 15 is an example of an ID management table that is stored in the authentication station 5.

Information on the portable communication terminal ID(A), wearable key ID (B), controlled device ID (C), user name (D), and fingerprint information (E) is registered by way of the correspondence relationships therebetween. For the fingerprint information (E) registration of individual information with a third party can be avoided by registering the source data after hashing the source data.

In this registration information, the portable communication terminal ID(A), user name (D), and fingerprint information (E) are stored in the identification code memory 23b of the lock release unit 20 of the portable communication terminal 3. The wearable key ID (B) is stored in the identification code memory 43b of the wearable key unit 4. In addition, the controlled device ID (C) is stored in the door unlocking control device 10 of automobile 1.

The fingerprint information (E) can be divided into two and held in the portable communication terminal 3 and wearable key unit 4.

Figure 16A:
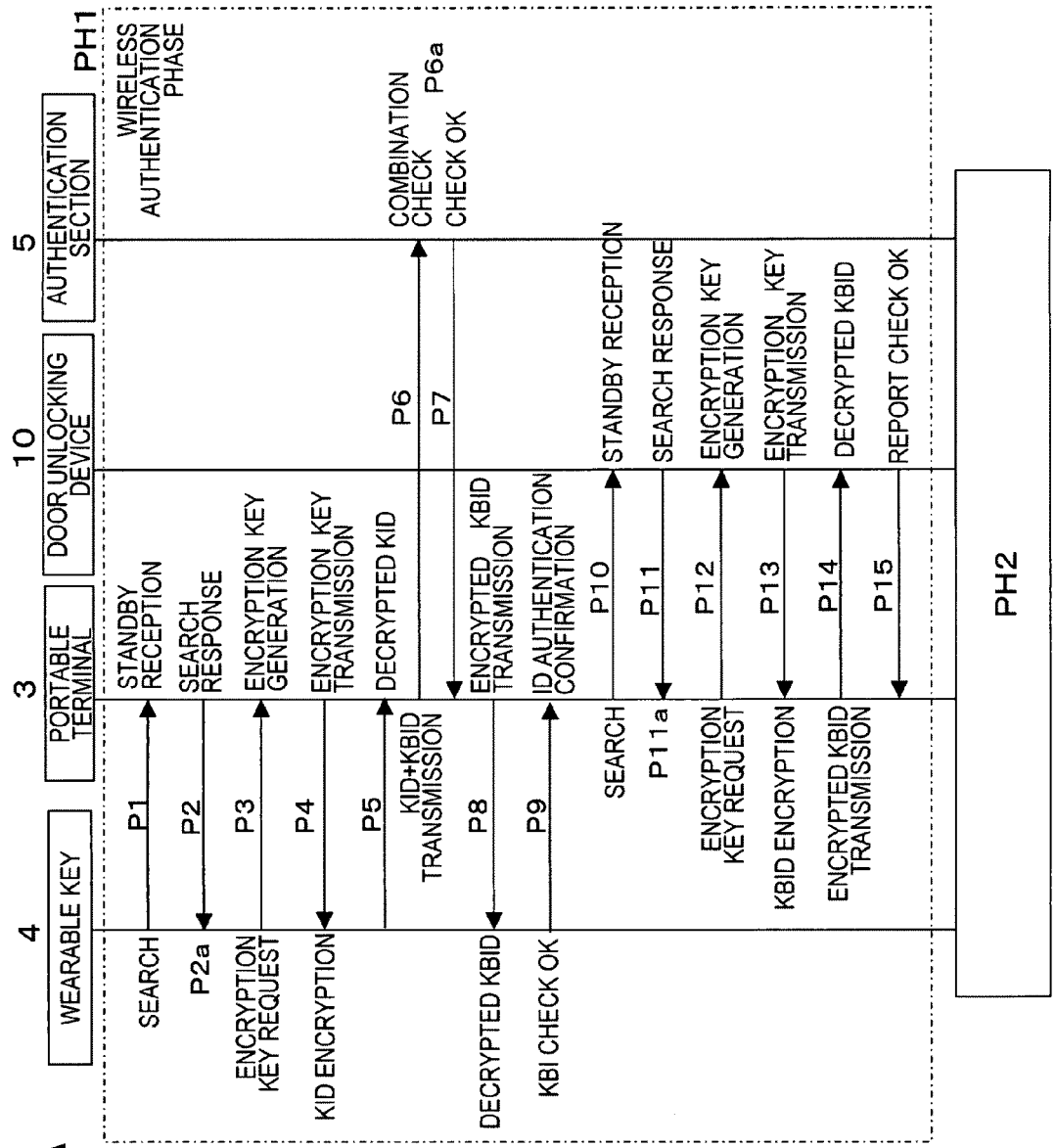
FIG. 16A is a flow chart of an authentication processing procedure of an embodiment shown in FIG. 3 according to the present invention (phase PH1)
Figure 16B:
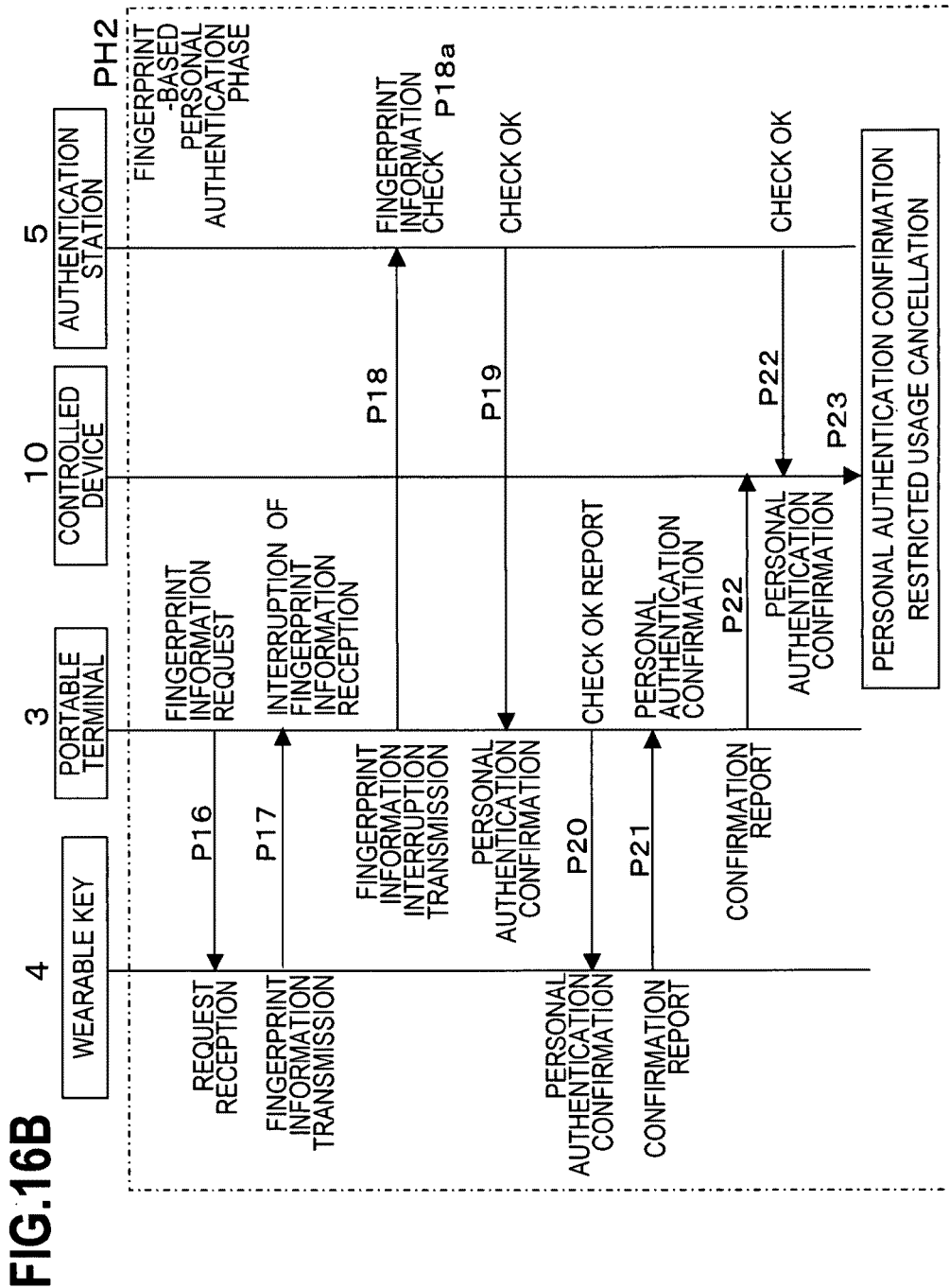
FIG. 16B is a flowchart of an authentication processing procedure of the embodiment shown in FIG. 3 according to the present invention (phase PH2)

FIGS. 16A and 16B are flowcharts showing the authentication processing procedure for the embodiment shown in FIG. 3 according to the present invention (phases PH1 and PH2).

Here, the processing procedure of FIG. 16A is a processing procedure for wireless confirmation phase PH1 which performs authentication between the portable communication terminal 3 and wearable key unit 4 and between the portable communication terminal 3 and door unlocking control device 10 via the authentication station 5. This processing procedure is basically carried out in the same way as the procedure of the patented invention (U.S. Pat. No. 2,931,276) that was applied for previously by the present applicant.

The processing procedure of FIG. 16B is a personal authentication phase that uses biometrics information as a characteristic of the present invention and fingerprint information in this embodiment.

Figure 17:
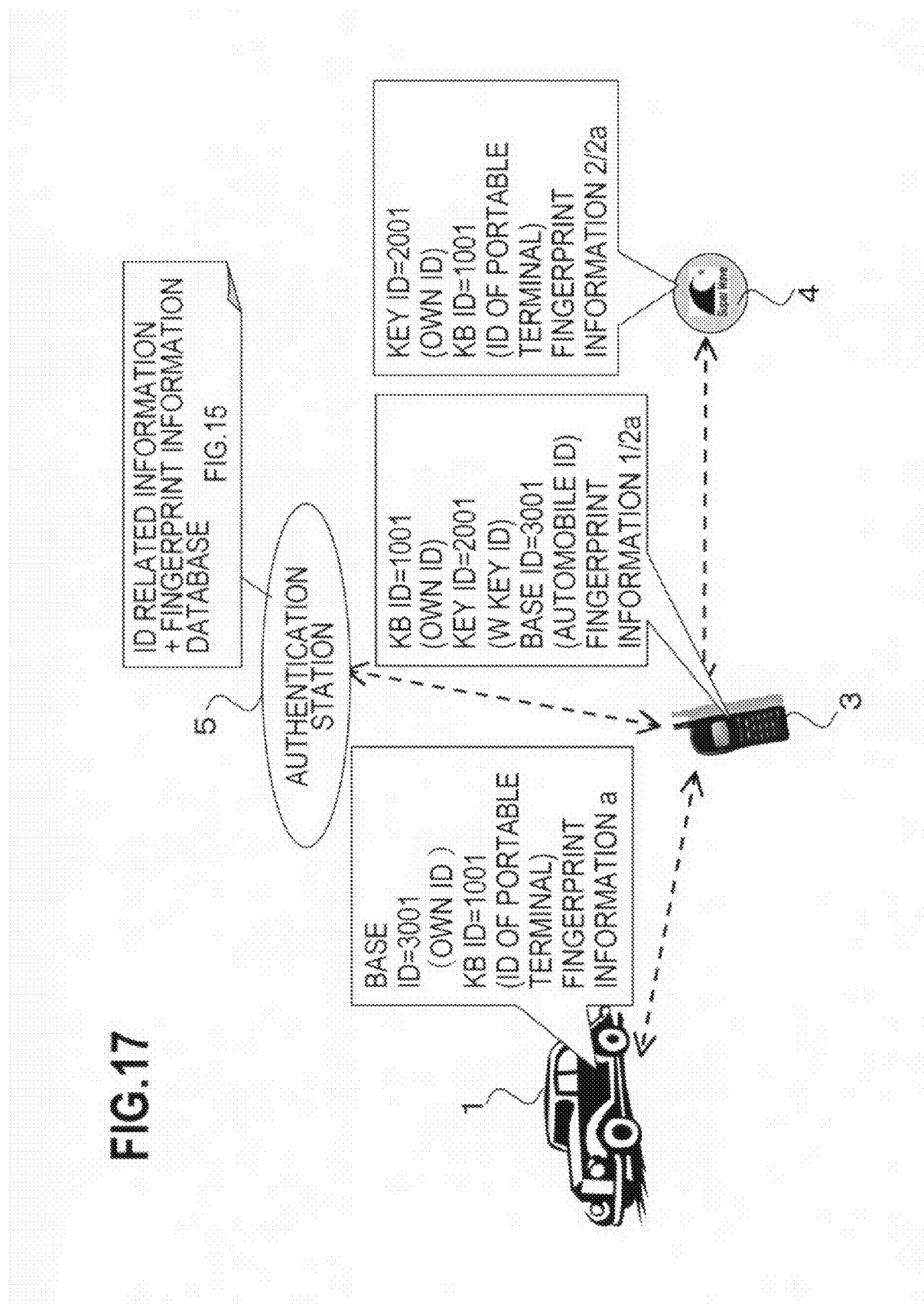
FIG. 17 illustrates an example of a distinctive ID and fingerprint information that are held in the door unlocking control device 10, portable communication terminal 3, and wearable key unit 4 of the automobile 1 which is a controlled device.

As a premise, the door unlocking control device 10 of the automobile 1 which is the controlled device, the portable communication terminal 3, and the wearable key unit 4 hold the distinctive IDs and fingerprint information shown in FIG. 17. Accordingly, the authentication station 5 holds ID association information and a fingerprint information database as shown in FIG. 15.

Supposing that the distinctive ID of the door unlocking control device 10 of automobile 1 is 3001, the distinctive ID of the portable communication terminal 3 is 1001, and the wearable key unit 4 is 2001, the door unlocking control device 10 holds its own distinctive ID 3001 and the distinctive ID 1001 of the portable communication terminal 3 and the portable communication terminal 3 holds its own distinctive ID 1001 and the distinctive ID 2001 of the wearable key unit 4. The wearable key unit 4 holds the distinctive ID 1001 of the portable communication terminal 3 and its own distinctive ID 2001.

In addition, fingerprint information for the user of the portable communication terminal 3 is registered in the door unlocking control device 10 and the same fingerprint information is divided and registered and held in the portable communication terminal 3 and wearable key unit 4.

When explaining the authentication processing of this premise in order, first, in FIG. 16A, the wearable key unit 4 transmits the M sequence data (M sequence signal) by means of a wireless signal as a call signal to the lock release unit 20 of the portable communication terminal 4 at predetermined time intervals (at intervals of two seconds, for example) (processing step P1).

Upon receipt of the M sequence data transmitted from the wearable key unit 4, the lock release unit 20 of the portable communication terminal 4 compares the M sequence data with the M sequence data stored in the identification code memory 23b (flash memory, for example). The comparison is performed by means of the coincidence and addition circuit 41c.

As a result of this comparison, the numerical value representing the number of bits that coincide between the two sets of M sequence data is output as a pulse signal. In cases where the coinciding bit count is equal to or more than a predetermined threshold value (a threshold value of 24 for 31 bit M sequence data, for example) and where the reception level of the M sequence data is equal to or more than a predetermined value, that is, in cases where the wearable key unit 4 and portable communication terminal 3 lie within a predetermined range (a few meters, for example), the lock release unit 20 of the portable communication terminal 4 transmits a confirmation response (ACK) to the call and identification information (terminal identification information) ID for the portable communication terminal 3 stored in the identification code memory 43b by means of a wireless signal (processing step P2).

However, in cases where the coinciding bit count is less than a predetermined threshold value or the reception level is less than a predetermined value, the lock release unit 20 of the portable communication terminal B does not transmit an ACK signal and the terminal identification information ID. In this case, as mentioned earlier, with the lock release unit 20 still making usage restrictions for the portable communication terminal 3, the portable communication terminal 3 is unable to use the door unlocking control device 10 which is the controlled device. In addition, the lock release unit 20 is able to display a message to that effect on the display section of the portable communication terminal 3.

Upon receipt of the ACK signal and terminal identification information ID, the wearable key unit 4 checks the received terminal identification information ID against the terminal identification information ID stored in its own identification code memory 43*b* (processing step P2*a*).

As a result of this check, in cases where the two terminal identification information IDs coincide, the wearable key unit 4 recognizes that the lock release unit 20 is a lock release unit that is paired with itself and transmits an encryption key transmission request to the portable communication terminal 3 (processing step P3). Upon receipt of the encryption key transmission request, the portable communication terminal 3 generates an encryption key and transmits same to the wearable key unit 4 (processing step P4).

Thereafter, the wearable key unit 4 uses the encryption key thus sent to encrypt its own distinctive ID (KID) and transmits same to the portable communication terminal 3 (processing step P5). The portable communication terminal 3 decrypts the encrypted distinctive ID (KID) of the wearable key unit 4.

The portable communication terminal 3 then transmits the distinctive ID (KID) of the decrypted wearable key unit 4 and the distinctive ID (KBID) of its own portable communication terminal 3 (processing step P6) to the authentication station 5. The authentication station 5 confirms the existence of coincidence in the combination of the distinctive ID (KID) of the wearable key unit 4 and the distinctive ID (KBID) of the portable communication terminal 3 by referencing the ID management table that was described earlier by means of FIG. 15 to obtain the two distinctive IDs (KID and KBID) thus sent (processing step P6*a*). In cases where it is possible to confirm coincidence between (KID) and (KBID), are port to that effect is transmitted to the portable communication terminal 3 (processing step P7).

However, in cases where, as a result of this check, a coincidence in the combination of the two distinctive IDs is not reported, it is identified that there is no relationship where the lock release unit 20 forms a pair with the wearable key unit 4.

If coincidence in the combination of the two distinctive IDs is reported by the authentication station 5, the lock release unit 20 of the portable communication terminal 3 encrypts the distinctive ID (KBID) of the portable communication terminal 3 and reports same to the wearable key unit 4 (processing step P8).

The wearable key unit 4 decrypts the encrypted distinctive ID (KBID) of the portable communication terminal 3 upon receipt thereof and checks and confirms the KBID before sending a confirmation report of the distinctive ID (KBID) to the portable communication terminal 3 (processing step P9).

As a result, it can be confirmed that the portable communication terminal 3 is able to use the door unlocking control device 10 of the automobile 1 which is the controlled device.

Therefore, the portable communication terminal 3 similarly transmits M sequence data (a M sequence signal) as a call signal to the door unlocking control device 10 of the automobile 1 at predetermined time intervals (2 second intervals, for example) by means of a wireless signal (processing step P10).

The door unlocking control device 10 has a send/receive and distinctive ID recognition function that is the same as that of the wearable key unit 4 and lock release unit 20 shown in FIGS. 6 and 7. Therefore, upon receipt of the M sequence data (M sequence signal) as the call signal from the portable communication terminal 3, the door unlocking control device 10 confirms the M sequence data and transmits a confirmation response (ACK) to the call and identification information (controlled device identification information) ID that is stored in the door unlocking control device 10 by means of a wireless signal (processing step P1).

Therefore, upon receipt of the ACK signal and terminal identification information ID from the door unlocking control device 10, the lock release unit 20 of the portable communication terminal 3 checks the terminal identification information ID thus transmitted against the terminal identification information ID stored in its own identification code memory 23*b* (processing step P11*a*).

In cases where the two terminal identification information IDs coincide as a result of this check, the lock release unit 20 recognizes that the door unlocking control device 10 is the controlled device that is its own pair and transmits an encryption key transmission request to the door unlocking control device 10 (processing step P12). Upon receipt of the encryption key transmission request, the door unlocking control device 10 generates an encryption key by encrypting KID and transmits the encrypted KBID to the lock release unit 20 of the portable communication terminal 3 (processing step P13).

Thereafter, the lock release unit 20 encrypts its own distinctive ID by using the transmitted encryption key and transmits same to the door unlocking control device 10 which is the controlled device (processing step P14). The door unlocking control device 10 decrypts the encrypted distinctive ID (KBID) of the portable communication terminal 3 thus reported and checks the result against the distinctive ID of the portable communication terminal 3 which is stored in the embodiment device.

If the check yields coincidence between the two distinctive IDs, a 'check OK' response is sent to the portable communication terminal 3 (processing step P15). Accordingly, authentication whereby the portable communication terminal 3 has usage rights to the door unlocking control device 10 which is the controlled device is granted.

However, in cases where the portable communication terminal 3 is used by another person as a result of being found or stolen or the like, such improper usage cannot be prohibited in the authentication phase PH1 and genuine personal authentication cannot be obtained.

Therefore, the present invention makes it possible to execute genuine personal authentication by adding a phase that performs authentication by also using information specifying an individual, that is, biometrics information such as fingerprint information, for example.

That is, as explained earlier, fingerprint information for an individual in order to use the portable communication terminal 3 is encoded and, as explained in FIG. 17, registered with the door unlocking control device 10, portable communication terminal 3, and wearable key unit 4. In addition, the fingerprint information is registered with the authentication station 5 in correspondence with the portable communication terminal ID, the controlled device, and the user name as shown in FIG. 15.

FIG. 16B shows the procedural flow of authentication phase Ph2 which is executed after authentication between the portable communication terminal 3 and wearable key unit 4 and between the portable communication terminal 3 and the door unlocking control device 10 which is the controlled device has been granted in authentication phase Ph1.

In cases where the reception level of the M sequence data is equal to or more than a predetermined value in authentication phase Ph1, that is, in cases where a state where the wearable key unit 4 and portable communication terminal 3 are not within a predetermined range (a few meters, for example) continues for a predetermined time, more security is afforded by deleting the registration of the fingerprint information.

A request for finger print information is issued from the portable communication terminal 3 to the wearable key unit 4 (processing step P16). In contrast, divided fingerprint information 2/2a is transmitted from the wearable key unit 4 to the portable communication terminal 3 (processing step P17).

The portable communication terminal 3 links the other part 1/2a of the divided fingerprint information that is held in the embodiment device and the fingerprint information 2/2a sent from the wearable key unit 4 to establish the pre-division fingerprint information and transmits same to the authentication station 5 (processing step P18).

The authentication station 5 checks the authenticity of the fingerprint information thus sent by referencing the ID management table in FIG. 15 (processing step P18a). If the check result is correct, the authentication station 5 sends a report to that effect to the portable communication terminal 3 (processing step P19).

Thereupon, the authentication station 5 also reports the fact that the fingerprint information check result is correct to the door unlocking control device 10 which is the corresponding controlled device from the ID management table (processing step P19a).

Upon receipt of the report to the effect that the check by the authentication station 5 yielded the correct result, that is, that personal authentication has been confirmed by the authentication station 5, the portable communication terminal 3 reports confirmation of the personal authentication to the wearable key 3 (processing step P20). The wearable key 3 sends back a confirmation response to the confirmation report to the portable communication terminal 3 (processing step P21).

Therefore, a report of confirmation of a person's identity is sent from the portable communication terminal 3 to the door unlocking control device 10 (processing step P22). Thereupon, the fact that authentication has been obtained beforehand by the authentication station 5 as a result of the fingerprint check is reported to the door unlocking control device 10 (processing step P19a). As a result, the door unlocking control device 10 enables door unlocking on the basis of a report to the effect that authentication has been obtained by both the portable communication terminal 3 and the authentication station 5.

INDUSTRIAL APPLICABILITY

As per the description of the embodiments with reference to the drawings, the present invention relates to a wireless authentication system that performs person authentication by using wireless radio waves and can be utilized as person authentication means with respect to a device for which security is required.

Even when a clone device of a portable device constituting the key to a controlled device is created and used improperly, access to the controlled device can be prevented. Therefore, person authentication can be executed reliably and stably.

In addition, because authentication that uses personal specification information such as biometrics information, namely a fingerprint or the like, for example, is applied, truly effective person authentication can be implemented. As a result, it is possible to provide an authentication system that provides greater peace of mind to people in a society in which authentication is becoming ubiquitous.

The invention claimed is:

1. A wireless authentication method, comprising the steps of:

performing a first authentication processing for a second communication device, by checking received identification information against identification information stored in an internal storage unit of a first communication device, when the first communication device judges that a transmission signal level from the second communication device is equal to or more than a predetermined value, and receives the identification information identifying the second communication device from the second communication device, by the first communication device;

reporting to a remote authentication station an authentication result including the identification information, when the first communication device succeeds the authentication of the second communication device by performing the first authentication processing, by the first communication device;

performing a second authentication processing for the second communication device, by checking the identification information including the authentication result against identification information stored in an internal storage unit of the authentication station, by the authentication station;

transmitting to the first communication device a cancellation permission signal to cancel the usage restrictions of a controlled device whose usage is restricted by the first communication device, when the authentication of the second communication device by the second authentication processing is successful, by the authentication station;

requesting personal specification information on the user to the second communication device, by the first communication device;

sending fingerprint information sent by the second communication device to the authentication station, by the first communication device;

performing a third authentication processing for the second communication device, by checking a correspondence relationship between the personal specification information and the identification information stored in the internal storage unit of the authentication station, by the authentication station; and sending to the first communication device confirmation signal indicating that a person's identity is confirmed, when the authentication station succeeds the authentication of the second communication device, by the authentication station, so that the authentication station validates the cancellation of the usage restrictions of the controlled device imposed by the first communication device based on the cancellation permission signal.

2. The wireless authentication method according to claim 1, wherein the authentication station sends to the controlled device the confirmation signal indicating that a person's identity is confirmed at the same time, when the authentication station succeeds the third authentication processing; and the controlled device validates the cancellation of the usage restrictions of the controlled device imposed by the first communication device, when the controlled device receives the confirmation of a person's identity from the first communication device and the authentication station.

3. The wireless authentication method according to claim 2, wherein the personal specification information is divided into a first part and a second part and stored in the first communication device and the second communication device respectively; and the personal specification information that is sent to the first communication device from the second communication device is the second part and the first communication device combines the second part of the personal specification information sent from the second communication device with the first part of the personal specification information and sends to the authentication station as personal specification information on the user.

4. The wireless authentication method according to claim 1, wherein the personal specification information is divided into a first part and a second part and stored in the first communication device and the second communication device respectively; and the personal specification information that is sent to the first communication device from the second communication device is the second part and the first communication device combines the second part of the personal specification information sent from the second communication device with the first part of the personal specification information and sends to the authentication station as personal specification information on the user.

5. The wireless authentication method according to claim 4, wherein the personal specification information is fingerprint information for the user.

6. The wireless authentication method according to claim 5, wherein the fingerprint information is registered by hashing source data.

7. The wireless authentication method according to claim 1, wherein the personal specification information is erased, when the distance between the first and second communication devices for which the transmission signal level from the second communication device is not equal to or more than a predetermined value is maintained for a predetermined time.

8. A wireless authentication system, comprising:

a first communication device and second communication device which communicate interactively with one another by a wireless line;

a controlled device for which the cancellation of usage restrictions is controlled by the first communication device; and an authentication station which communicates interactively between the first communication device and the controlled device;

wherein the authentication station stores respective distinctive IDs of the first communication device, the second communication device, and the controlled device, and personal specification information of a user using by the first communication device corresponding to the distinctive ID;

the first communication device performs a first authentication processing for the second communication device, by checking received identification information against identification information stored in an internal storage unit of the first communication device, when the first communication device judges that a transmission signal level from the second communication device is equal to or more than a predetermined value, and receives identification information identifying the second communication device from the second communication device;

the first communication device reports the authentication result including the identification information to the remote authentication station, when the first communication device succeeds the authentication of the second communication device by performing the first authentication processing;

the authentication station performs a second authentication processing for the second communication device, by checking the identification information included in the authentication result against identification information stored in an internal storage unit of the authentication station;

the authentication station transmits to the first communication device a cancellation permission signal to cancel the usage restrictions of the controlled device whose usage is restricted by the first communication device, when the authentication station succeeds the authentication of the second communication device by performing the second authentication processing;

the first communication device requests personal specification information of the user to the second communication device, and sends fingerprint information sent by the second communication device to the authentication station;

the authentication station performs a third authentication processing for the second communication device, by checking a correspondence relationship between the personal specification information and identification information stored in an internal storage unit of the authentication station; and the authentication station sends to the first communication device a confirmation signal indicating that a person's identity is confirmed, when the authentication station succeeds the authentication of the second communication device by performing the third authentication processing, so that the authentication station validates the cancellation of the usage restrictions of the controlled device imposed by the first communication device based on the cancellation permission signal.

9. The wireless authentication system according to claim 8, wherein the authentication station sends to the controlled device the confirmation signal indicating that a person's identity is confirmed at the same time, when the authentication station succeeds the third authentication processing; and the controlled device validates the cancellation of the usage restrictions for the controlled device imposed by the first communication device, when the controlled device receives a confirmation report of a person's identity from the first communication device and the authentication station.

10. The wireless authentication system according to claim 9, wherein the personal specification information is divided into a first part and a second part and stored in the first communication device and the second communication device respectively; and the personal specification information that is sent to the first communication device from the second communication device is the second part and the first communication device combines the second part of the personal specification information sent from the second communication device with the first part of the personal specification information and sends to the authentication station as personal specification information on the user.

11. The wireless authentication system according to claim 8, wherein the personal specification information is divided into a first part and a second part and stored in the first communication device and the second communication device respectively; and the personal specification information that is sent to the first communication device from the second communication device is the second part and the first communication device combines the second part of the personal specification information sent from the second communication device with the first part of the personal specification information and sends to the authentication station as personal specification information on the user.

12. The system authentication system according to claim 11, wherein the personal specification information is fingerprint information for the user.

13. The wireless authentication system according to claim 12, wherein the fingerprint information is registered by hashing source data.

14. The wireless authentication system according to claim 8, wherein the personal specification information is erased, when the distance between the first and second communication devices for which the transmission signal level from the second communication device is not equal to or more than a predetermined value is maintained for a predetermined time.

15. The wireless authentication system according to claim 8, wherein the controlled device is a door unlocking control device of an automobile.

* * * * *